(12) United States Patent
Nagasaka

(10) Patent No.: US 8,648,797 B2
(45) Date of Patent: Feb. 11, 2014

(54) INFORMATION INPUT/OUTPUT DEVICE, INFORMATION INPUT/OUTPUT METHOD AND COMPUTER PROGRAM

(75) Inventor: Kenichiro Nagasaka, Tokyo (JP)

(73) Assignee: Sony Corporation, Tokyo (JP)

( * ) Notice: Subject to any disclaimer, the term of this patent is extended or adjusted under 35 U.S.C. 154(b) by 928 days.

(21) Appl. No.: 12/436,222

(22) Filed: May 6, 2009

(65) Prior Publication Data

US 2009/0282331 A1  Nov. 12, 2009

(30) Foreign Application Priority Data

May 8, 2008 (JP) ................................ P2008-121996

(51) Int. Cl.
*G09G 5/00* (2006.01)
(52) U.S. Cl.
USPC .......................................... 345/156; 345/157
(58) Field of Classification Search
USPC ................. 345/156–158; 710/1, 5, 15, 18–19
See application file for complete search history.

(56) References Cited

U.S. PATENT DOCUMENTS

| | | | | |
|---|---|---|---|---|
| 4,988,981 A | * | 1/1991 | Zimmerman et al. | 345/158 |
| 5,143,505 A | * | 9/1992 | Burdea et al. | 414/5 |
| 5,512,919 A | * | 4/1996 | Araki | 345/156 |
| 5,617,515 A | * | 4/1997 | MacLaren et al. | 700/264 |
| 5,625,576 A | * | 4/1997 | Massie et al. | 703/6 |
| 5,670,987 A | * | 9/1997 | Doi et al. | 345/156 |
| 5,828,813 A | * | 10/1998 | Ohm | 700/260 |
| 5,880,717 A | * | 3/1999 | Chan et al. | 345/173 |
| 5,898,599 A | * | 4/1999 | Massie et al. | 345/161 |
| 5,982,353 A | | 11/1999 | Gallery et al. | |
| 5,999,185 A | * | 12/1999 | Kato et al. | 345/420 |
| 6,405,158 B1 | * | 6/2002 | Massie et al. | 703/6 |
| 6,424,333 B1 | * | 7/2002 | Tremblay et al. | 345/156 |

(Continued)

FOREIGN PATENT DOCUMENTS

| | | |
|---|---|---|
| JP | 62-162479 | 7/1987 |
| JP | 10-039997 | 2/1998 |

(Continued)

OTHER PUBLICATIONS

Notification of Reasons for Refusal, issued Apr. 27, 2010 with English language translation from the Japanese Patent Office in corresponding Japanese Patent application No. 2008-121996.

(Continued)

*Primary Examiner* — Jason Mandeville
(74) *Attorney, Agent, or Firm* — Finnegan, Henderson, Farabow, Garrett & Dunner, L.L.P.

(57) ABSTRACT

An information input/output device includes: a position input unit configured to designate a position by a user in a prescribed operation area $S_d$ in real space; a designated position measurement unit configured to measure a designated position "$r_d$" in the operation area $S_d$, which is designated by the user in the position input unit; an operation area offset amount determination unit configured to determine an offset amount "$\Delta r_{v0}$" of an origin position "$r_{v0}$" of an operation area $S_v$ in virtual space based on the measured position "$r_d$" in the operation area $S_d$; and a designated position determination unit configured to determine a designated position "$r_v$" in virtual space which corresponds to the position in real space designated by the user through the position input unit based on the measured position "$r_d$" in the operation area $S_d$, the origin position "$r_{v0}$" of the operation area $S_v$ in virtual space and the determined offset amount "$\Delta r_{v0}$".

10 Claims, 16 Drawing Sheets

(56) References Cited

U.S. PATENT DOCUMENTS

| | | | |
|---|---|---|---|
| 6,526,669 B2* | 3/2003 | Nagata | 33/503 |
| 6,697,044 B2* | 2/2004 | Shahoian et al. | 345/156 |
| 6,707,449 B2* | 3/2004 | Hinckley et al. | 345/173 |
| 6,763,320 B2 | 7/2004 | Kimble | |
| 7,027,031 B2* | 4/2006 | Kawasaki et al. | 345/156 |
| 7,348,965 B2* | 3/2008 | Itoh | 345/173 |
| 7,480,600 B2* | 1/2009 | Massie et al. | 703/6 |
| 8,049,733 B2* | 11/2011 | Betts-LaCroix et al. | 345/173 |
| 2003/0146898 A1* | 8/2003 | Kawasaki et al. | 345/156 |
| 2005/0222830 A1* | 10/2005 | Massie et al. | 703/6 |
| 2006/0284834 A1* | 12/2006 | Itkowitz et al. | 345/156 |
| 2008/0055248 A1* | 3/2008 | Tremblay et al. | 345/158 |
| 2008/0059138 A1* | 3/2008 | Tremblay et al. | 703/11 |

FOREIGN PATENT DOCUMENTS

| | | |
|---|---|---|
| JP | 10-334278 | 12/1998 |
| JP | 11-513157 | 11/1999 |
| JP | 2001-100906 | 4/2001 |
| JP | 3329443 | 7/2002 |
| JP | 2006-503350 | 1/2006 |

OTHER PUBLICATIONS

Haruhisa Kawasaki et al., "Mutli-Fingered haptic Interface Opposed to Human Hand", Journal of the Robotics Society of Japan, vol. 23, No. 4, pp. 449-456, 2005.

Francois Conti et al, "Spanning Large Workspaces Using Small Haptic Devices", IEE WorldHaptics, 2005.

* cited by examiner

LEFT-HAND POINTER GROUP        RIGHT-HAND POINTER GROUP

INFORMATION INPUT/OUTPUT DEVICE, INFORMATION INPUT/OUTPUT METHOD AND COMPUTER PROGRAM

BACKGROUND OF THE INVENTION

1. Field of the Invention

The present invention relates to an information input/output device, an information input/output method and a computer program performing input/output of information in response to user operation, and particularly relates to an information input/output device, an information input/output method and a computer program performing operation with respect to virtual space through user operation in real space as well as performing output of information so as to feed back a force sense from virtual space.

Further more particularly, the invention relates to an information input/output device, an information input/output method and a computer program using an operation area $S_d$ in real space and performing operation in an operation area $S_v$ in virtual space which corresponds to the operation area $S_d$, particularly, relates to an information input/output device, an information input/output method and a computer program performing output of information so as to provide a user with a tactile sense from all over the virtual space by expanding an accessible range in virtual space by moving the operation area $S_v$ in virtual space which corresponds to the operation area $S_d$ in real space in accordance with user's intent.

2. Description of the Related Art

In a technical field such as virtual reality and telereality, a force/tactile display, namely, a "haptic device" for feeding back a force sense or a tactile sense to an operator in addition to visual information and hearing information is indispensable.

Along with improvement of computer speed and progress of a simulation technology in recent years, virtual environment in which plural objects coexist and physical interaction such as collision or contact occurs between them can be simulated in real time. When collision between objects or a contact force at that time can be calculated exquisitely as well as in real time in consideration of dynamics as described above, senses when the user touches or grips an object in the virtual environment through the haptic device can be fed back to the user with reality by actually generating the calculated force by a motor.

Applications of the haptic device are wide. In learning of special skills such as medical care or the like, remote operations in virtual environment such as microcosms or oceans and in special or dangerous environment such as a nuclear reactor, a three-dimensional force/tactile senses with respect to objects in environments which are difficult to be actually touched can be fed back. According to scale or accuracy of virtual space which can be processed in real time, increase of demand of the force/tactile display is expected in the future.

For example, a pen-type haptic device using a serial link as shown in FIG. 16 is common. The user grips a tip portion of a pen shape, in which the 3-axis force to 6-axis force moment is fed back.

In addition, a haptic device feeding back the 3-axis force to 6-axis force moment by using a parallel-link structure is proposed as a structure for solving lack of stiffness of the serial link as shown in FIG. 17.

In any of the above haptic devices using the link mechanisms, force/tactile feedback is performed back with respect to only one point of a gripping position, in other words, the force/tactile feedback is not performed to respective fingers of an operator independently. Accordingly, there is a problem that it is difficult to feed back a sense of gripping a virtual object by fingers.

On the other hand, when using a multi-finger type haptic device, the operator can obtain a sense as if he/she grips a work object. This kind of haptic device is applied to a master hand which remotely operates a slave hand such as a robot hand, thereby having a function of transmitting motion of the master hand (operation means) to the slave hand (work means) as well as feeding back a force sense of the slave hand side to the mater hand.

In order to feed back the force to plural fingers, a haptic device in which fingers and remote motors are connected by wires and the force is applied to respective fingers through the wires as shown in FIG. 18 is proposed. However, in such device structure, it is necessary to control so that the wires are not slackened at any time, which may complicate the control. In addition, the interference between wires is liable to occur, particularly, movable range concerning rotation is not so wide.

A haptic device in which a hand-type force feedback mechanism is added to an opposed manipulator as shown in FIG. 19 is also proposed (for example, refer to Attributed to Haruhisa Kawasaki, Takumi Hori and Tetsuya Mouri "Opposed multi-finger haptic interface" (Journal of the Robotics Society of Japan Vol. 23, No. 4, pp 449-456, 2005) (Non-Patent Document 5)). As a method similar to this, a method of adding the hand-type force feedback mechanism to tips of an exoskeleton is also proposed. In addition, a method of feeding back 3-axis force to fingers by installing finger-stalls at a tip of the serial link is also proposed (for example, refer to JP-A-2004-299999 (Patent Document 2)).

The virtual space in which simulation is performed extends endlessly, whereas, since an operation area of the haptic device has constraints in movable range of the device, the operation area is limited, and the user accesses only to part of virtual space corresponding to the limited operation area. In FIG. 20, an operation area $S_d$ of the serial-link structure haptic device in real space and an operation area $S_v$ corresponding to the operation area $S_d$ in virtual space. The operation area $S_d$ has constraints of movable range of the haptic device. Therefore, the user can touch an object in the operation area $S_v$ in virtual space corresponding to the operation area $S_d$ of the haptic device, however, it is difficult that the user touches an object outside the operation area $S_v$. For example, in the drawing, the user can receive a tactile sense (force feedback) with respect to an object A in the operation area $S_v$, however, it is difficult that the user obtains the tactile sense with respect to an object B which is outside the operation area $S_v$.

In order to touch the object B which is outside the operation area $S_v$, that is, in order to obtain the tactile sense by the user from the object B through the haptic device, it is necessary to move (parallel movement) the operation area $S_v$ in virtual space corresponding to the operation area $S_d$ of the haptic device in real space to a position including the object B.

Naturally, the range of virtual space which can be accessed by the user is expanded when the movable range of the device like the serial-link mechanism is expanded, however, which makes the device large in size and incurs cost increase.

In a field of GUI (Graphical User Interface), it is possible to move the operation area and allow a mouse cursor to access all over a GUI screen by performing an operation of lifting a mouse every time the mouse reaches edges of a mouse pad and arranging the mouse on the mouse pad again, namely, "Indexing" is performed repeatedly. However, the operation of "lifting to rearrangement" corresponds to an operation of stopping processing of movement of the mouse cursor on the screen and performing the processing again, therefore, the operation is not applied to the haptic device on the basis of continuous input.

Additionally, a method of giving an offset instruction of the operation area $S_v$ in virtual space by using an input interface such as a switch together. However, the operation will be complicated when the input degree of freedom of the haptic device is increased, which prevents intuitive operation. For example, in the case of operation of the opposed manipulator shown in FIG. 19, the input degree of freedom opposed according to fingers can be sensed intuitively as a continuous operation of respective fingers, however, the input interface operation which gives the offset instruction of the operation area $S_v$ is not continuous, therefore, it is difficult that the operation is intuitive.

According to the above reason, it is necessary that the operation area $S_v$ in virtual space is moved only by the original input operation of the haptic device performing operation in virtual space. Alternately, when the offset of the operation area $S_v$ in virtual space is performed by detecting intent of the user based on the input operation with respect to the haptic device, the operation becomes intuitive and natural, which largely improves user-friendliness of the haptic device.

The relationship as shown by the following formula is established between a position "$r_d$" of a tip of the haptic device and a position "$r_v$" of a pointer in virtual space as shown in FIG. 20.

$$r_v = r_{v0} + K r_d \quad (1)$$

In the above formula (1), "$r_{v0}$" represents a position of the origin of the haptic device in virtual space. "K" is a scale factor, which provides a scale between actual displacement of the haptic device and displacement of the pointer in virtual space.

As can be seen from the above formula (1), when the scale factor "K" becomes large, the pointer in virtual space can be largely moved by small displacement of the haptic device, as a result, it is possible to expand the operation area $S_v$ in virtual space which can be operated by the same operation area $S_d$ in real space of the haptic device. That is to say, if the haptic device is small, the device can touch large virtual space. However, positional resolution is reduced at the same time when the scale factor "K" becomes large, therefore, there occurs a problem that the tactile sense is reduced. In addition, to change the scale factor "K" is different from to give the offset to the operation area $S_v$, therefore, even when virtual space touched by the device is expanded, it is still difficult to touch objects outside the fixed operation area $S_v$ in the virtual area.

Furthermore, a method in which a scale factor between minute displacement "$\delta r_d$" of the haptic device and minute displacement "$\delta r_v$" of the pointer in virtual space is changed according to speed "$v_d$" of the haptic device, which is called as "ballistics" can be cited. As a rule, setting is performed so that the higher the speed of the haptic device is, the larger the scale factor "K" becomes. Accordingly, when precise interaction in which speed of the haptics device is low is performed, lack of resolution can be avoided.

$$\delta r_v = K(\dot{r}_d) \delta r_d \quad (2)$$

However, in the "ballistics", the position "$r_{v0}$" which is the position of the origin of the haptic device in virtual space is not managed, therefore, the operation area $S_d$ of the haptic device is gradually shifted from the operation area $S_v$ in virtual space. Accordingly, there is a disadvantage that a situation that operation has to be performed in the vicinity of boundaries in the operation area $S_d$ of the haptic device often occurs.

There is also a method of using the haptic device as a speed operation device, which is called as a "rate control". In the method, speed of the pointer in virtual space according to the tip position "$r_d$" of the haptic device is provided, which is represented as the following formula (3).

$$\dot{r}_v = K r_d \quad (3)$$

According to the "rate control", it is possible to access all over the space. However, motion of the haptic device is given to the pointer by performing integration, therefore, it will be a first-order lag system and there are problems that it is difficult to obtain a tactile sense of a rigid body and that it is difficult to perform rapid motion instruction.

Moreover, a method of changing a scale factor of actual displacement of the haptic device with respect to displacement of the pointer in virtual space, and a method of changing speed of the operation area $S_v$ in proportion to speed and a position of the haptic device based on knowledge of psychophysics in human beings as a hybrid method which combines the ballistics with the rate control as shown in the following the formula (4) (For example, refer to Attributed to F. Conti and O. Khatib "Spanning Large Workspaces Using Small Haptic Devices" (IEEE World Haptics 2005) (Non-Patent Document 7)).

$$\dot{r}_v = K |\dot{r}_d| r_d \quad (4)$$

In the hybrid method, there is a problem that the operation area is not moved when speed of the haptic device becomes "0", even if the user desires to reach farther space. In addition, since the operation area $S_v$ moves also during contact interaction such as grazing a floor, the haptic device may give a sense of incongruity such as "slipping" to the user.

SUMMARY OF THE INVENTION

It is desirable to provide an excellent information input/output device, an information input/output method and a computer program which are capable of performing operation with respect to virtual space through user operation in real space as well as capable of performing preferable information output for feeing back a force sense from virtual space.

It is further desirable to provide an excellent information input/output device, an information input/output method and a computer program which are capable of preferably performing operation in the operation area $S_v$ in virtual space corresponding to the operation area $S_d$ by using operation area $S_d$ in real space.

It is further desirable to provide an excellent information input/output device, information input/output method and a computer program which are capable of performing information output so as to give a tactile sense from all over virtual space to the user by expanding an accessible range in virtual space by moving the operation area $S_v$ in virtual space which corresponds to the operation area $S_d$ in real space according to intent of the user.

It is further desirable to provide an excellent information input/output device, information input/output method and a computer program which is capable of performing an object operation in the operation area Sv and an operation of moving the operation area in virtual space continuously by using only an input interface for operation in virtual space movable range of which is limited to thereby perform precise interaction without a sense of incongruity.

A first embodiment of the invention is directed to an information input/output device including a position input unit configured to designate a position by a user in a prescribed operation area $S_d$ in real space, a designated position measurement unit configured to measure a position "$r_d$" in the operation area $S_d$, which is designated by the user in the position input unit, an operation area offset amount determination unit configured to determine an offset amount "$\Delta r_{v0}$" of an origin position "$r_{v0}$" of an operation area $S_v$ in virtual space based on the measured position "$r_d$" in the operation area Sd and a designated position determination unit configured to determine a designated position "$r_v$" in virtual space which corresponds to the position in real space designated by the user through the position input unit based on the measured position "$r_d$" in the operation area $S_d$ and the determined offset amount "$\Delta r_{v0}$".

Here, the position input unit abuts on a fingertip or other parts of a body of the user, inputting the moved amount "$r_d$" based on motion of the abutting portion as the designated position.

The position input unit can be configured as a haptic device which feeds back a force sense. That is, the position input unit feeds back a force/tactile sense according to the position "$r_v$" in virtual space determined by the designated position determination unit to the user by applying the force/tactile sense to part of the body of the user abutting on the position input unit.

In the technical field such as virtual reality and telereality, the haptic device for feeding back a force sense or a tactile sense to an operator is indispensable in addition to visual information and hearing information. For example, the multi-finger type haptic device can give a sense as if the user directly works on a work target.

The virtual space has originally almost endless extent, whereas the movable range of the haptics device is limited, therefore, the operation area in virtual space is just the same size as the operation area in real space. Accordingly, in order to obtain the tactile sense from a virtual object at the outside of the operation area, it is necessary, at present, to move the operation area in virtual space corresponding to the operation area in real space so as to house the object. The present inventor considers that it is possible that the operation of the object in virtual space and the operation of moving the operation area in virtual space continuously if the operation area in virtual space can be moved by using an input interface for operation in virtual space together, such as a serial-link mechanism to be attached to a fingertip of the user, and that user can perform intuitive and comprehensive as well as precise interaction without a sense of incongruity.

In the information input/output device according to the embodiment of the invention, the physical operation area of the position input unit which is also used as the haptic device is divided into two areas of an interaction area and a movement area. That is, the operation area $S_d$ which is possessed by the position input unit in real space is divided into the movement area at peripheral edges of the operation area $S_d$ and the interaction area which is inside the movement area.

The operation area offset amount determination unit determines at which area the designated position "$r_d$" in the measured operation area $S_d$ exists in the interaction area or the movement area. At this time, when the designated position "$r_d$" exists in the interaction area, the offset amount "$\Delta r_{v0}$" is not given to the origin position "$r_{v0}$" of the operation area $S_v$ in virtual space (that is, "$\Delta r_{v0}$"=0). When the designated position "$r_d$" exists in the movement area, the offset amount "$\Delta r_{v0}$" according to the designated position "$r_d$" is given to the origin position "$r_{v0}$" of the operation area $S_v$ in virtual space.

Therefore, when the user operation reaches the movement area, the offset is given to the operation area $S_v$ by moving the origin "$r_{v0}$" of the operation area $S_v$ in virtual space according to the infiltration amount to the movement area. As a result, though the range in which the haptic device itself can mechanically move is limited, it is possible to access an arbitrary position in virtual space extending endlessly.

On the other hand, in the operation in the interaction area, information output for normal force/tactile interaction is performed without generating the movement of the operation area $S_v$ in virtual space. In the interaction area, it is possible to optimize performance as a haptic device and a sense of incongruity such as grazing or slipping is not given to the user or performance does not deteriorate during contact interaction with respect to the virtual object.

In the information input/output device according to the embodiment of the invention, the operation area is moved in virtual space without using an additional input interface, therefore, the operation is continued from the operation for the normal force/tactile feedback, as a result, user operation is not complicated. That is, the user can access an arbitrary position in virtual space through the intuitive operation of stretching a hand in a direction of an object the user desires to touch, which realizes the intuitive and natural operation system.

The information input/output device according to the embodiment of the invention can further include a display, a camera position determination unit configured to move a coordinate system of a camera model for drawing a state in virtual space according to the offset amount "$\Delta r_{v0}$" determined by the operation area offset amount determination unit, a virtual environment drawing unit configured to render the state in virtual space from the viewpoint of the coordinate system defined as the camera model and displaying the state on the display.

The force/tactile feedback means gives force/tactile feedback from virtual space, whereas, the virtual environment drawing unit can give visual feedback, and a virtual environment closer to reality can be given to the user by a combination of both. As described above, the information input/output device according to an embodiment of the invention is characterized in a point that the operation area $S_v$ in virtual space is moved continuously in response to user operation with respect to the virtual environment through the position input unit, however, when the camera coordinate system is not moved in conjunction of the movement of the origin position "$r_{v0}$", the finger pointer corresponding to the position "$r_v$" is left behind at the outside of the drawing area with the movement of the operation area $S_v$ in virtual space, which leads to an unavailable state. On the other hand, the camera position determination unit moves the coordinate system of the camera model together according to the offset amount "$\Delta r_{v0}$" of the origin position "$r_{v0}$" of the operation area $S_v$ in virtual space, thereby housing the designated position "$r_v$", namely, the finger pointer in the drawing area at any time to maintain the state in which operation in virtual environment is possible.

The force/tactile feedback means includes, for example, an object data accumulation unit configured to accumulate attribute information inducing geometric attribute and dynamic attribute possessed by respective objects existing in virtual space, a dynamics computation unit performs dynamics computation with respect to respective objects accumulated in the object data accumulation unit as well as changing positions and postures of respective objects based on the computation results, a collision detection unit configured to detect a collision event between respective objects accumulated in the object data accumulation unit, a collision force calculation unit configured to calculate force acted at a collision point detected in the collision detection unit, an action force calculation means for calculating an action force to be applied to part of a user's body which abuts on the position input unit based on the force calculated in the collision force calculation unit, and a force/tactile addition means for applying a force/tactile force based on the action force calculated by the action force calculation means to part of the user's body which abuts on the position input unit, in which an appropriate force/tactile sense is given to the user through the position input unit.

The invention can be extended and applied to a multi-finger system in which plural haptic devices for one finger are combined. That is, plural position input units respectively corresponding to plural fingers "j" of the user are provided. The operation area offset amount determination unit can determine the offset amount "$\Delta r_{v0}$" of the origin position "$r_{v0}$" of the operation area $S_v$ in virtual space based on an average position or a weighted average position of designated positions "$r_{jd}$" in the operation area $S_d$ designated by respective position input units. Furthermore, the invention can be also applied to a multi-finger system for both arms, not only one arm.

The information input/output device can deal with not only the translational motion but also a rotational motion as a designated motion by the user in the operation area. A second aspect of the invention is directed to an information input/output device which deals with the designated motion by the user including the rotational motion, and includes a position input unit formed so as to perform rotational motion, taking a given front posture as the center, in which the user designates a posture angle as a position in a given operation area $S_d$ in real space, a designated position measurement unit configured to measure a posture angle $R_d$ designated in the position input unit, an operation area offset amount determination unit in which the operation area $S_d$ possessed by the position input unit in real space is divided into an interaction area in a range of a posture angle $\pm\Theta$ with respect to the front posture and a movement area which is outside the interaction area, at which area the measured designated posture angle $R_d$ in the operation area $S_d$ exists in the interaction area and the movement area is determined, and when the designated posture angle $R_d$ exists in the interaction area, an offset amount "$\Delta\gamma_{v0}$" is not given to a front posture angle "$R_{v0}$" of the operation area $S_v$ in virtual space, whereas, when the designated posture angle $R_d$ exists in the movement area, the offset amount "$\Delta\gamma_{v0}$" according to the designated posture angle $R_d$ is given to the front posture angle "$R_{v0}$" of the operation area $S_v$ in virtual space, and a designated position determination unit configured to determine a designated position $R_v$ in virtual space corresponding to the position in real space designated by the user through the position input unit based on the measured designated posture angle Rd in the operation area $S_d$, the front posture angle "$R_{v0}$" of the operation area $S_v$ in the virtual space and the determined offset amount "$\Delta\gamma_{v0}$".

The information input/output device according to the second embodiment of the invention can also include a display, a camera position determination unit configured to move a coordinate system of a camera model for drawing a state in virtual space according to the offset amount "$\Delta\gamma_{v0}$" of the designated posture $R_v$ determined by the operation area offset amount determination unit, a virtual environment drawing unit configured to render the state in virtual space from the viewpoint of the coordinate system defined as the camera model and displaying the state on the display, thereby giving visual feedback in addition to force/tactile feedback. Additionally, the camera position determination unit moves the coordinate system of the camera model together according to the offset amount "$\Delta\gamma_{v0}$" of the front posture "$R_{v0}$" of the operation area $S_v$ in virtual space, thereby housing the designated posture $R_v$, namely, the finger pointer in the drawing area at any time, which maintains the state in which operation in virtual environment is possible.

A third embodiment of the invention is directed to a computer program written in a computer readable form so as to execute information input/output processing for performing operation with respect to virtual space through user operation in real space on a computer, and allowing the computer to execute a designated position acquiring process acquiring a designated position "$r_d$" in a prescribed operation area $S_d$ designated by the user through a position input unit which designates a position by the user in the operation area $S_d$ in real space, an operation area offset amount determination process determining an offset amount "$\Delta r_{v0}$" of an origin position "$r_{v0}$" of an operation area $S_v$ in virtual space based on the acquired position "$r_d$" in the operation area $S_d$ and a designated position determination process determining a designated position "$r_v$" in virtual space which corresponds to the position in real space designated by the user through the position input unit based on the acquired position "$r_d$" in the operation area $S_d$, the origin position "$r_{v0}$" of the operation area $S_v$ in virtual space and the determined offset amount "$\Delta r_{v0}$", in which the operation area $S_d$ possessed by the position input unit in real space is divided into a movement area at peripheral edges of the operation area $S_d$ and an interaction area which is inside the movement area, and in which, in the operation area offset amount determination process, at which area the designated position "$r_d$" in the measured operation area $S_d$ exists in the interaction area and the movement area is determined, and when the designated position "$r_d$" exists in the interaction area, the offset amount "$\Delta r_{v0}$" is not given to the origin position "$r_{v0}$" of the operation area $S_v$ in virtual space, whereas, when the designated position "$r_d$" exists in the movement area, the offset amount "$\Delta r_{v0}$" according to the designated position "$r_d$" is given to the origin position "$r_{v0}$" of the operation area $S_v$ in virtual space.

The computer program according to the third embodiment of the invention defines the computer program written in a computer readable form so as to realize prescribed processing on a computer. In other words, the computer program according to the embodiment of the invention is installed in the computer, thereby realizing cooperant operation on the computer and obtaining same operation and effect as the information input/output device according to another embodiment of the invention.

According to the embodiments of the invention, it is possible to provide an excellent information input/output device, an information input/output method and a computer program capable of performing operation preferably in the operation area $S_v$ in virtual space which corresponds to the operation area $S_d$ by using the operation area $S_d$ in real space.

Also according to the embodiments of the invention, it is possible to perform information output which gives a tactile sense to a user from positions all over virtual space by moving the operation area $S_v$ in virtual space which corresponds to the operation area $S_d$ in real space according to user's intent and extending an accessible range in virtual space.

In the information input/output device according to the embodiment of the invention, the physical operation area of the device is divided into two areas of the interaction area and the movement area. In operation in the interaction area, normal force/tactile interaction is performed without generating movement of the operation area $S_v$ in virtual space. On the other hand, when the user operation reaches the movement area, the origin "$r_{vO}$" of the operation area in the virtual area is moved according to the infiltration amount to the movement area to give an offset to the operation area $S_v$. Therefore, the user can access an arbitrary position in virtual space through an intuitive operation of stretching a hand in a direction of an object the user desires to touch. As a result, though the range in which the position input unit itself used also as a force/tactile feedback means can mechanically move is limited, it becomes possible to access an arbitrary position in virtual space extending endlessly, which remarkably extends an application range.

Additionally, since the information input/output device according to the embodiment of the invention does not use an additional input interface for moving the operation area in virtual space, user operation is not complicated. That is, the user can move the operation area in virtual space only by the operation of stretching a hand in a direction of an object the user desires to touch, which realizes an intuitive and natural operation system.

The information input/output device according to the embodiment of the invention has a configuration which can optimize performance as a haptic device in the operation area where interaction is performed, in which a sense of incongruity such as grazing or slipping is not given to the user or performance does not deteriorate during contact interaction with respect to a virtual object.

It is not necessary to enlarge the information input/output device according to the embodiment of the invention for expanding the operation area, therefore, the device can be made small in size and costs can be reduced. As a result, popularization to family can be expected, for example, the device can be used as an interface for video games.

Further other features and advantages will become clear by explanation in more detail based on later-described embodiments of the invention and attached drawings.

DESCRIPTION OF THE PREFERRED EMBODIMENTS

Hereinafter, embodiments of the invention will be described in detail with reference to the drawings.

In a technical field such as virtual reality and telereality, a "haptic device" for feeding back a force sense or a tactile sense to an operator in addition to visual information and hearing information is indispensable. For example, a multi-finger type haptic device can give a sense to the operator as if the operator is directly working on a work target.

Since a movable range of the haptic device is limited, an operation area in virtual space has the same size as an operation area in real space. Therefore, at the present, in order to obtain a tactile sense from a virtual object which is outside the operation area, it is necessary to move the operation area in virtual space corresponding to the operation area in real space so as to house the object.

In a force feedback device according to an embodiment of the invention, a physical operation area of the device is divided into two areas of an interaction area and a movement area.

In user operation in the interaction area, normal force/tactile interaction is performed without moving an operation area $S_v$ in virtual space. It is possible to optimize performance as the haptic device in the interaction area, in which a sense of congruity such as grazing or slipping is not given to the user during contact interaction with respect to a virtual object or performance does not deteriorate during contact interaction with respect to the virtual object.

On the other hand, when the user operation reaches the movement area, an offset is given to the operation area $S_v$ by moving an operation area origin "$r_{vo}$" in virtual area according to the infiltration amount to the movement area. Therefore, though the range in which the force feedback device itself can mechanically move is limited, the user performs operation in the movement area by an intuitive operation of stretching a hand in a direction of an object the user desires to touch, thereby performing an access to an arbitrary position in virtual space extending endlessly.

Figure 1:
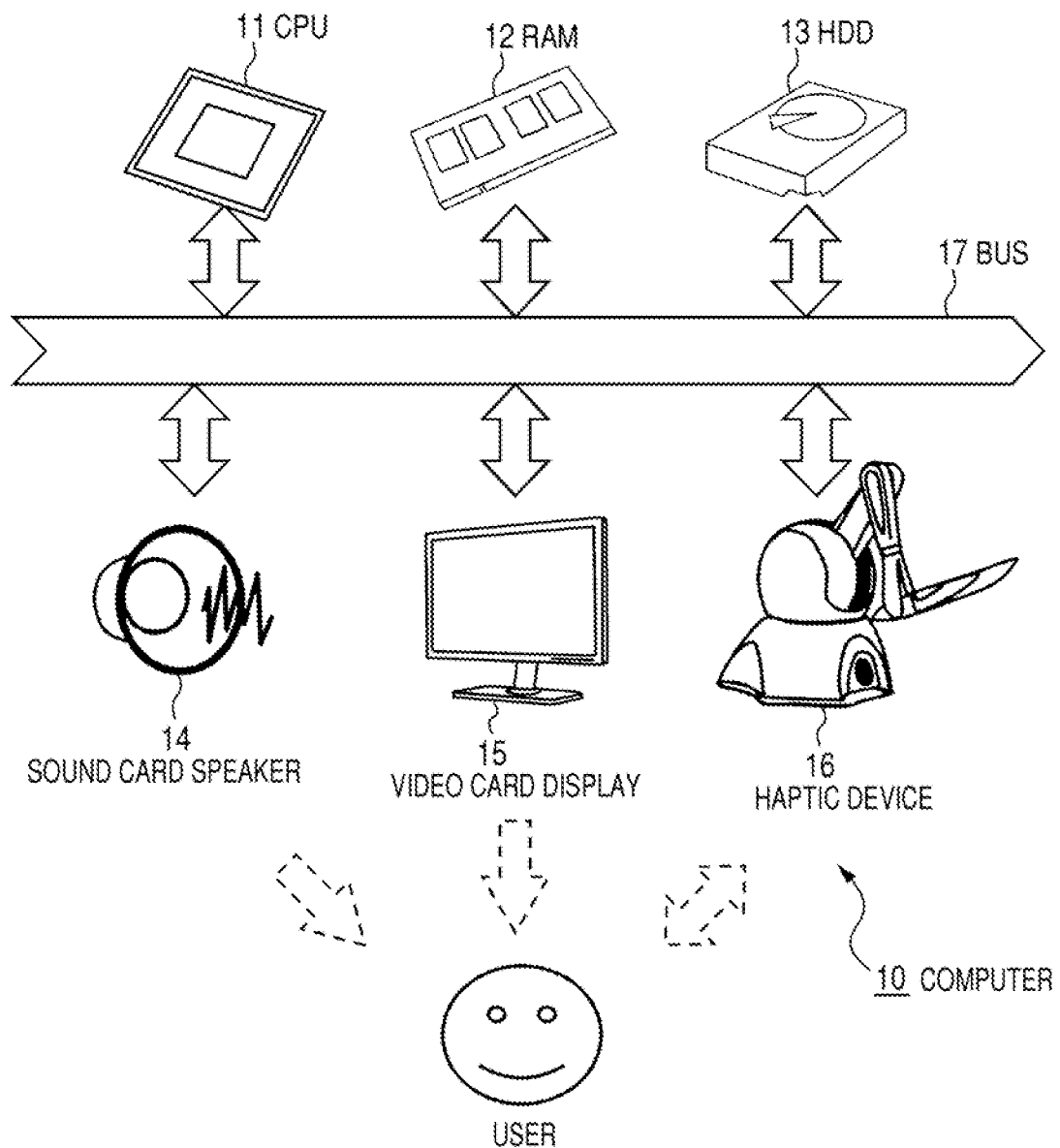
FIG. 1 is a view showing a configuration example of a system to which a haptic device is applied.

FIG. 1 shows a configuration example of a system to which the haptic device is applied. In the shown system, a state of a three-dimensional space built on a computer 10 is fed back to the user through input/output devices such as a speaker, a display and a force feedback device (haptic device) 16.

On the computer 10, a CPU (Central Processing Unit) 11 calculates temporal variations of sound information, video information, force information and the like relating to events generated in the three-dimensional space in real time based on data recorded in a hard disc (HDD) 13, which is written in a memory (RAM) 12.

The sound information, the video information and the force information generated in the three-dimensional space are outputted through a sound card and a speaker 14, a video card and a display 15, and a haptic device 16. The three-dimensional space built on the computer is fed back to the user with high reality and realistic sensations as if the space actually existed by commanding these input/output systems in a synchronized and cooperated manner.

The above devices 11 to 16 are connected by a high-speed bus 17 having sufficient speed for securing a real-time property, which realizes the exchange of information mutually.

Figure 2:
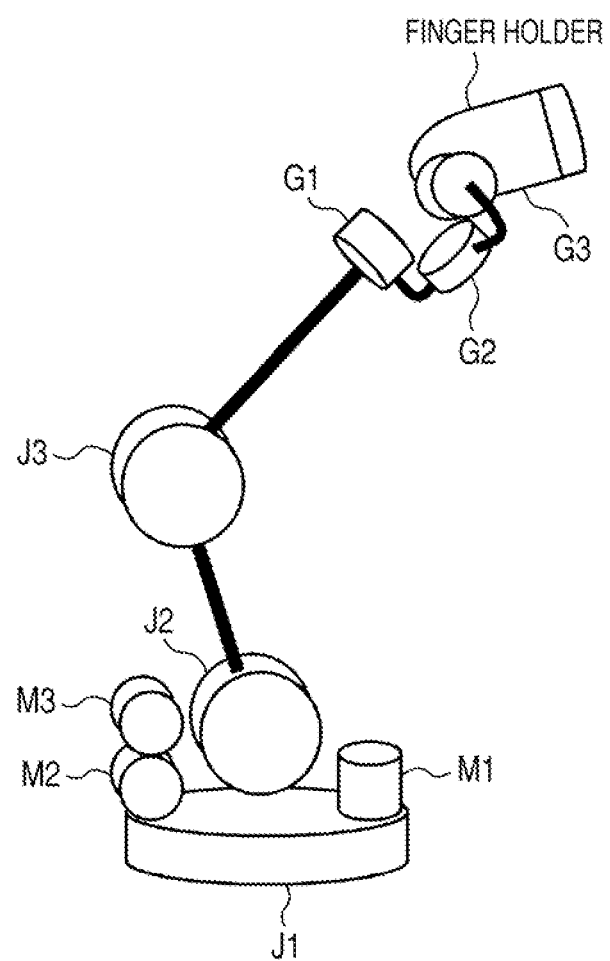
FIG. 2 is a view showing a structure example of a haptic device which can be applied to the system shown in FIG. 1.

FIG. 2 shows a structure example of a haptic device which can be applied to the system shown in FIG. 1. The device is a unit for one finger, and a multi-finger haptic device can be formed by combining units for respective fingers.

The haptic device in the drawing has a serial-link structure, including a finger holder portion holding a fingertip of a user by inserting the fingertip, a force feedback unit configured to feed back force in space with respect to the fingertip held by the finger holder portion and a finger-holder portion support unit attached at a tip potion of the force feedback unit for supporting the finger holder portion so as to prevent generation of an unnecessary moment at a tip portion of the serial link forming the force feedback device.

The force feedback unit includes a basic 3 degree-of-freedom drive system having three joints J1, J2 and J3 connecting between links, feeding back force of a translational 3 degree-of-freedom with respect to the finger holder portion at the tip. The respective joints J1, J2 and J3 are driven joints which are driven by motors M1, M2 and M3 by wire transmission.

The finger-holder portion support unit supports the finger holder portion at a tip portion of an arm which forms the force feedback unit. In the shown example, the finger-holder portion support unit includes gimbal mechanism G1, G2 and G3 having 3 degree-of-freedom. The gimbal mechanism has a structure in which three axes of yaw, roll and pitch are orthogonal to one another and cross at one point, connecting the finger holder portion and the serial-link arm structure, which allows the finger holder portion to rotate freely.

The driven joints J2 and J3 are operated by torque coupled drive. At output axes of respective motors M1, M2 and M3, encoders are installed, where angles of the respective driven joints J1, J2 and J3 can be calculated from values thereof. In addition, at the gimbal mechanisms G1, G2 and G3, potentiometers are installed, where angles thereof can be measured.

For example, the force/tactile feedback device disclosed in a commonly-owned earlier Patent Application No. 2007-272098 can be used as the haptic device 16 connected to the computer 10.

It should be readily understood by those skilled in the art that an operation area of the haptic device shown in FIG. 2 is limited. A main feature of the system is to give the user a suitable tactile sense by accessing an arbitrary position in virtual space having wide range, which is beyond the limited operation range of the haptic device through user operation as natural as possible.

Figure 3:
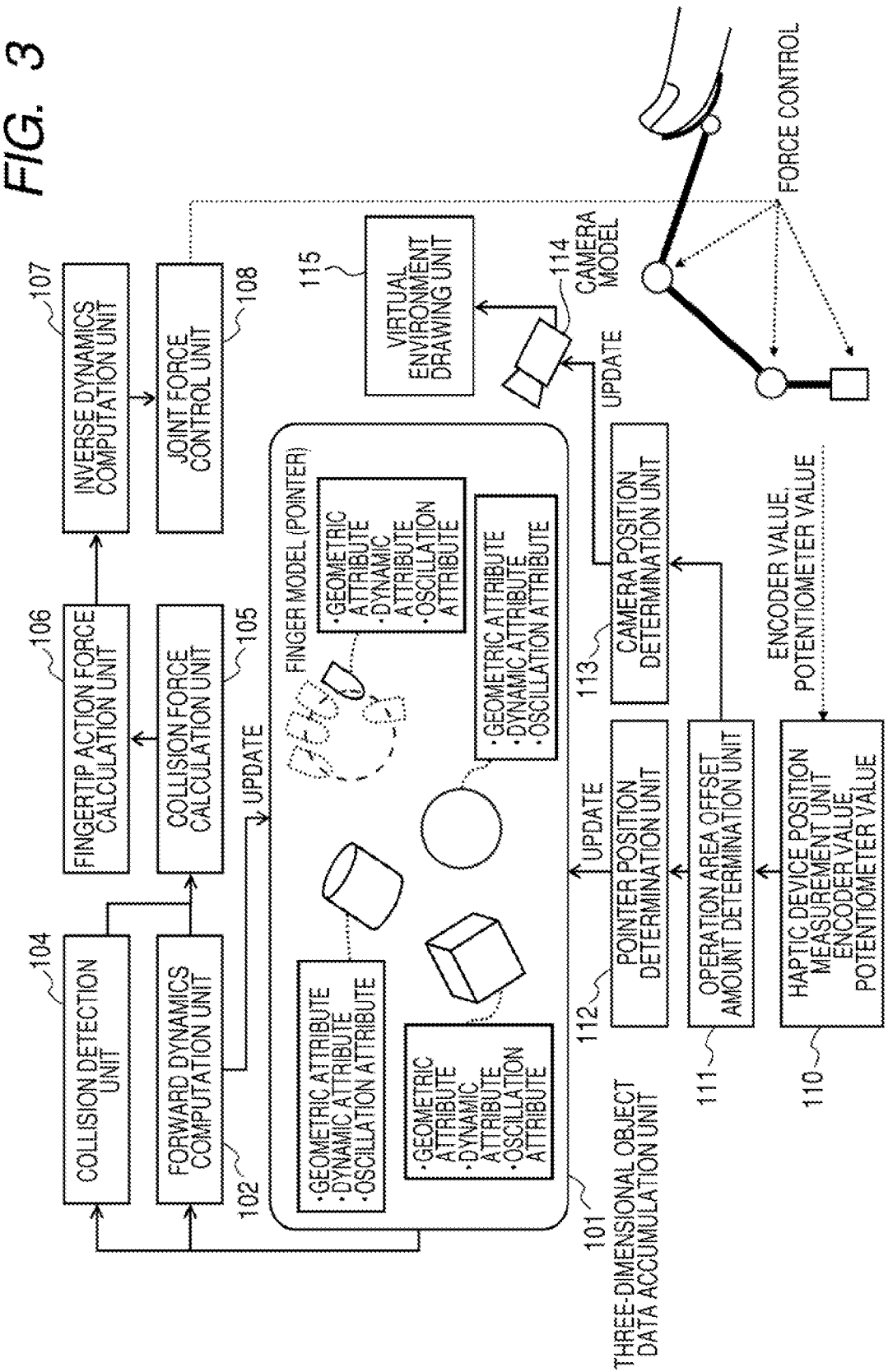
FIG. 3 is a diagram schematically showing a configuration of a control program executed on the CPU 11 in order to obtain a tactile sense by accessing an arbitrary position in virtual space through the haptic device by the user.

FIG. 3 schematically shows a configuration of a control program executed on the CPU 11 in order to obtain a tactile sense by accessing an arbitrary position in virtual space by the user through the haptic device.

A state of virtual three-dimensional space is prescribed by attribute information included in respective objects existing in the space. The attribute information of respective objects is held in a three-dimensional object data accumulation unit 101. The substance of the three-dimensional object data accumulation unit 101 is, for example, the HDD 12. As attribute information of respective objects, data concerning a geometric attribute such as a position, a posture, a size, connection relation and a joint position, a dynamic attribute such as mass, inertia tensor, friction, a reflection coefficient, joint generative force and external force, and oscillation attribute such as damping characteristics and natural oscillation waveform can be cited, which is used when temporal variations such as sound information, video information and force information relating to events generated in the three-dimensional space are calculated. In the three-dimensional object data also includes a finger model concerning multi-fingers of the user. Also concerning the finger model, parameters such as the geometric attribute, dynamic attribute and oscillation attribute are held in the same manner as other objects.

The oscillation attribute is used for generating sound effect with reality based on dynamic simulation results when an interaction such as collision or contact occurs between objects on the three-dimensional virtual space. A method of generating effective sound is disclosed in, for example, a commonly-owned earlier application, JP-A-2007-164291. However, since the generation of effective sound is not directly related to the gist of the invention, further description will not be given in the specification.

A camera model 114 gives viewpoints for drawing a state in the virtual environment represented by the three-dimensional object data on a display. The camera model 114 includes information such as a position, a posture and a field angle of a camera. (The "camera" referred to in the specification is not a physical camera recording images of subjects but an element defining a viewpoint when drawing a three-dimensional scene in a computer graphics field, which is also referred to as a "virtual camera".)

A virtual environment drawing unit 115 renders the state of three-dimensional object data from the viewpoint of a coordinate system defined as the camera model 114, displaying the state on the display 15.

The position, the posture and the like of each object in the three-dimensional object data accumulation unit 101 are changed according to results of dynamics computation in a forward dynamics computation unit 102. The forward dynamics computation defined here indicates computation for obtaining acceleration generated in an object based on force generated inside the object and force acted on the outside of the object. Motion of the object is simulated by integrating the acceleration based on Newton-Euler dynamics. The results of the forward dynamics computation are reflected on the position, the posture and the like of each object, thereby each object displays motion with reality based on dynamics rules.

In the embodiment of the invention, the configuration of the forward dynamics computation unit 102 is not particularly limited. For example, the forward dynamics computation FWD which is disclosed in a commonly owned earlier application, JP-A-2007-108955, can be applied also to the invention. It is also preferable that the forward dynamics computation is separated into four processes and executed in the order of inertia information calculation, speed information calculation, force information calculation and acceleration information calculation. In such case, it is possible to obtain acceleration generating at an arbitrary position and in an arbitrary direction under a condition that an arbitrary force is acted on a link structure such as a robot. However, in the object data of the position and the posture of the finger model, an actual position and a posture of the finger obtained in a haptic device position measurement unit 110 are reflected, not the simulation results by the forward dynamics computation.

The encoders measuring rotation angles are installed at respective joints J1, J2 and J3 of the serial link which forms the haptic device 16, and potentiometers are installed at the gimbal mechanisms G1, G2 and G3. The haptic device position measurement unit 110 performs well-known forward dynamics computation (computation of calculating the position/posture of a given point on the link structure from a joint value) based on output values of the encoder and the potentiometer, calculating the actual position and the posture of the finger of the user to which the haptic device 16 is attached.

A pointer position determination unit 112 multiplies a position "$r_d$" at the tip of the haptic device by the scale factor "K" based on the above formula (1), adding a position "$r_{v0}$" of the haptic device origin in virtual space to the result to determine a position "$r_v$" of the finger pointer in virtual space.

Figure 4:
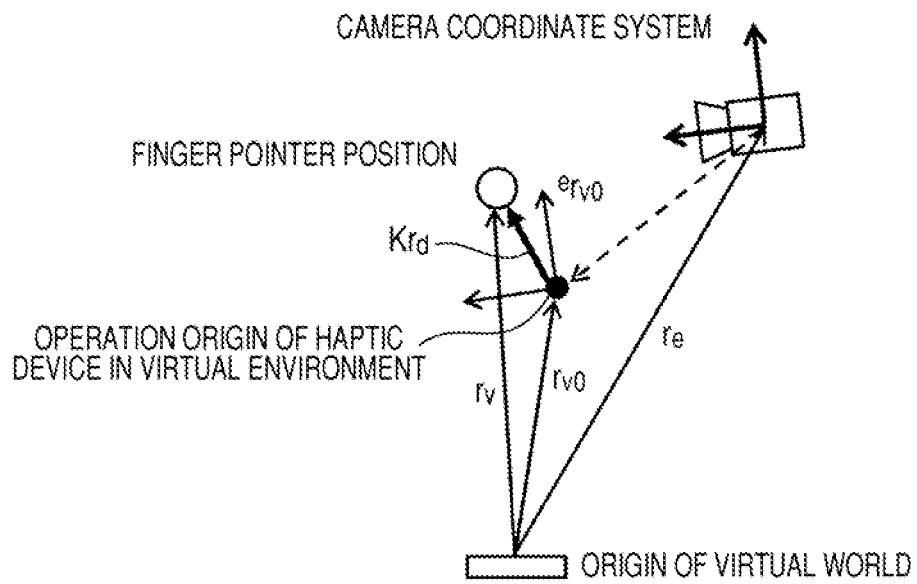
FIG. 4 is a view showing a state in which a position of a camera coordinate system is determined so that an origin position of the haptic device 16 seen from the camera coordinate system is at a fixed position "$^e r_v$" (in the case of translational motion)

Then, a camera position determination unit 113 moves a coordinate system of the camera model 114 in conjunction with the position "$r_{v0}$" of the origin of the haptic device in virtual space. If the camera coordinate system is not moved in conjunction with movement of the origin position "$r_{v0}$", the finger pointer is left behind at the outside of the drawing area with the movement of the operation area $S_v$ in virtual space, which leads to an unavailable state. The camera position determination unit 113 determines the position of the camera coordinate system so that the origin position of the haptic device 16 is at a fixed position "$^e r_v$" seen from the camera coordinate system, moving a camera coordinates "$r_e$" in parallel by the same amount as an offset amount "$\Delta r_{v0}$" of the origin position "$r_{v0}$" of the haptic device 16 as shown in FIG. 4. The camera position determination unit 113 moves the coordinate system of the camera model together according to the offset amount "$\Delta r_{v0}$" of the origin position "$r_{v0}$" of the operation area $S_v$ in virtual space, thereby housing a designated position "$r_v$", namely, the finger pointer in the drawing area at any time to maintain the state in which operation in virtual environment is possible.

A collision detection unit 104 detects a collision event between objects in the three-dimensional object data accumulation unit 101, calculating a set of collision points. A method of detecting collision between objects is not particularly limited in the embodiment of the invention. For example, a method of detecting collision using a GJK algorithm (Gilbert-Johnson-Keerthi distance algorithm) and the like can be used. Concerning description in more detail, please refer to, for example, JP-A-2007-102394 which has been assigned to the present applicant.

A collision force calculation unit 105 calculates an external force acting on the collision point calculated in the collision detection unit 104 and registers the external force as external information of the corresponding objects in the three-dimensional object data accumulation unit 101. The registered external information is used for computation in the forward dynamics computation unit 102, which affects motion of each object. A method of calculating collision force is not particularly limited in the embodiment of the invention, and a calculation method disclosed in a commonly-owned earlier application, JP-A-2007-108955, can be applied.

A fingertip action force calculation unit 106 calculates a resultant force of forces acted on respective finger models in external forces calculated in the collision force calculation unit 105. The fingertip action force calculated here is the external force acted on the finger models when respective finger models touch another object, which corresponds to the external force which is received by fingers of a human from the external world. The force is fed back to the haptic device 16, thereby feeding back a sense of touching a virtual object to the user.

An inverse dynamics computation unit 107 calculates a joint force which is necessary for generating (that is, giving an external force to be fed back to fingers of the user) the force calculated in the fingertip action force calculation unit 106 at the tip of the haptic device 16. Generally, the haptic device 16 has weight, inertia and friction, therefore, the force calculated in the fingertip action force calculation unit 106 is fed back after removing these effects by considering dynamics. This control method is referred to as "dynamics compensation control", and for example, a control method disclosed in a commonly-owned earlier application, Patent Application No. 2007-272099, can be applied.

A joint force control unit 108 controls motors at respective joints so that respective joints of the haptic device 16 generates the joint force obtained in the inverse dynamics computation unit 107 by, for example, current control. Accordingly, a sense of touching a virtual object can be fed back through fingertips of the user which are attached to the finger holder.

Figure 5:
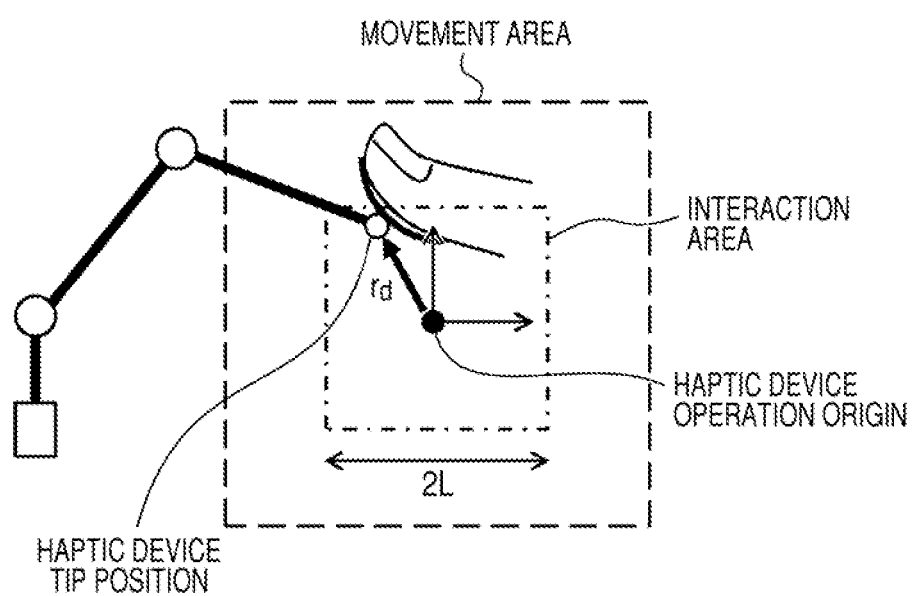
FIG. 5 is a view showing a state in which an operation area possessed by the haptic device 16 in real space is divided into two areas of a movement area at peripheral edges of the operation area and an interaction area which is inside the movement area (in the case of translational motion)

An operation area offset amount determination unit 111 determines the position "$r_{v0}$" in virtual space at the origin of the haptic device in response to user operation with respect to the haptic device 16. Since the movable range is fixed according to mechanical/physical constraints, the operation area in real space is limited. In the embodiment, the operation area in real space possessed by the haptics device 16 is divided into two areas which is a movement area at the peripheral edges of the operation area and an interaction area which is inside the movement area as shown in FIG. 5.

In the case that the haptic device tip position "$r_d$" exists in the interaction area, the position "$r_{v0}$" of the haptic device origin in virtual space is not moved, therefore, precise force/tactile interaction is realized as usual. During contact interaction with respect to the virtual object, highly precise force/tactile interaction is realized without giving a sense of incongruity such as grazing or slipping to the user.

On the other hand, in the case that the tip position "$r_d$" of the haptic device 16 exists in the movement area, the position "$r_{v0}$" of the haptic device origin in virtual space is offset in proportion with the distance from the interaction area. Though the range in which the haptic device 16 can mechanically move is limited, the user performs operation in the movement area by an intuitive operation of stretching a hand in the direction of an object the user desires to touch, thereby accessing an arbitrary position in virtual space extending endlessly.

That is to say, the operation area origin "$r_{v0}$" in virtual space with respect to the tip position "$r_d$" of the haptic device 16 is determined as the following formulas (5) to (7).

$$|r_{d_i}| < L \Rightarrow \Delta r_{v0i} = 0 \tag{5}$$

$$r_{d_i} > L \Rightarrow \Delta r_{v0i} = C(r_{d_i} - L) \tag{6}$$

$$r_{d_i} < -L \Rightarrow \Delta r_{v0i} = C(r_{d_i} + L) \tag{7}$$

In the above formulas (5) to (7), "$\Delta r_{v0}$" represents the increase of the position "$r_{v0}$" of the haptic device origin in virtual space. A subscript "i" is an index representing an "X, Y, Z component" of the position and "$r_{di}$" and "$\Delta r_{v0i}$" indicates a first component of "$r_d$" and "$\Delta r_{v0}$". "C" represents a proportionality constant and "L" represents the half of the length of one edge of the rectangular interaction area.

The position "$r_e$" in the camera coordinate system also moves as the following formula (8) according to the movement amount "$\Delta r_{v0}$" of the haptic device origin "$r_{v0}$" in virtual space obtained as the above (refer to FIG. 4). "$\Delta r_e$" represents the increase of "$r_e$".

$$\Delta r_e = \Delta r_{v0} \tag{8}$$

The position "$r_e$" in the camera coordinate system is moved in conjunction with the movement of the origin position "$r_{v0}$" of the haptic device 16 as shown in the above formula (8) for preventing the finger pointer from being left behind at the outside of the drawing area with the movement of the operation area $S_v$ of virtual space (as described above). In other words, the finger pointer is housed in the drawing area at any time to maintain the state in which operation in the virtual environment is possible.

Figure 6:
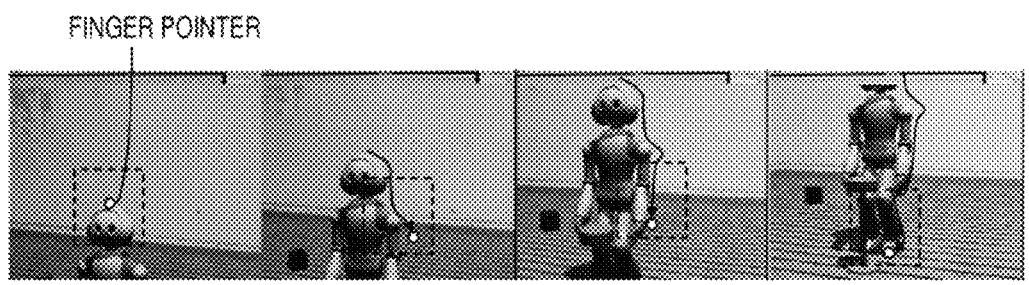
FIG. 6 is a view showing a state of movement of an origin position "$r_{vO}$" in virtual space in response to user operation in the movement area of the haptic device 16 and movement of a position "$r_e$" of the camera coordinate system performed together.

FIG. 6 shows a situation in which the operation area Sv in virtual space is moved by using an algorithm of the movement of the origin position "$r_{v0}$" in the virtual area according to user operation in the movement area of the haptic device 16 and the movement of the position "$r_e$" of the camera coordinate system caused by the movement which is represented by the above formulas (5) to (8). The area represented by a dashed line in the drawing corresponds to the interaction area.

In the shown example, though the operation area $S_d$ of the haptic device 16 in real space is limited, the operation area $S_v$ is allowed to be offset by moving the origin position "$r_{v0}$" in virtual space, thereby accessing all over the entire body of a CG character (agent) (which is larger in size than the operation area $S_d$). That is, the coordinate system of the camera model is moved together according to the offset amount "$\Delta r_{v0}$" of the origin position "$r_{v0}$" of the operation area Sv in virtual space, it is possible to house the designation position "$r_v$", namely, the finger pointer in the display screen of the display 15 at any time and to maintain the state in which operation in the virtual environment is possible. On the other hand, when the movement of the origin position "$r_{v0}$" in virtual space is not performed, the user can touch only points near the head of the agent.

In the embodiment, the operation area Sv in virtual space is naturally offset (according to the infiltration amount to the movement area in the operation area Sd) only by moving the user's hand in the direction of a place that the user desires to touch without using input unit other than the haptic device 16 as shown in FIG. 2, therefore, user can access all over the area in virtual space without feeling stress. In the operation of the haptic device 16 in the interaction area of the operation area Sd, excellent force/tactile feedback can be performed by realizing original performance of the haptic device 16 without generating problems such as slipping or reduction of resolution.

Figure 7A:
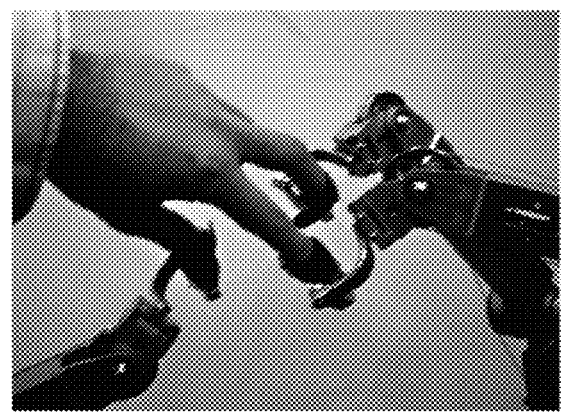
FIG. 7A is a view showing an appearance of a multi-finger system in which plural one-finger haptic devices area combined.
Figure 7B:
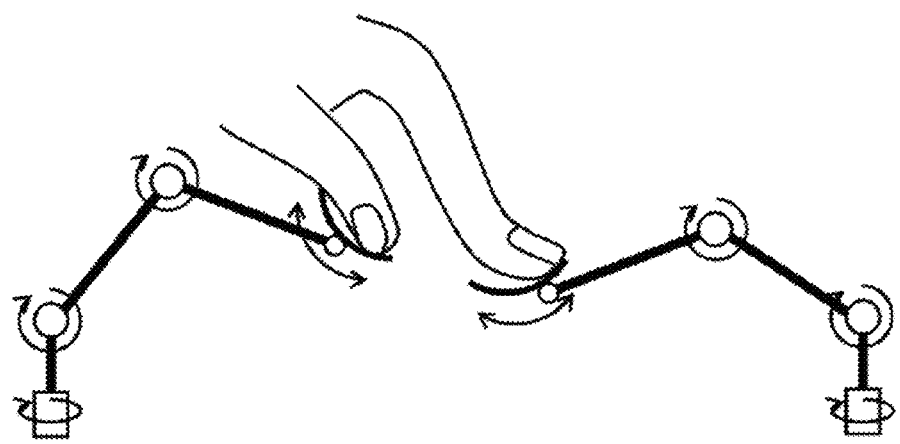
FIG. 7B is a view showing a functional structure of a multi-finger system in which plural one-finger haptic devices area combined.

In the above description, only the case in which one-finger haptic device (refer to FIG. 2) is used has been explained for simplifying the explanation. It is a matter of course that the invention can be extended and applied to a multi-finger system in which plural one-finger haptic devices are combined as shown in FIG. 7A and FIG. 7B. In this case, tip positions of haptic devices of all fingers are calculated instead of calculating the tip position of single one-finger haptic device, and an average position "$c_d$" as shown in the following formula (9) or more commonly, a weighted average as shown in the following formula (10) is used for determination of the operation area offset amount.

$$c_d = \frac{\sum_{j=1}^{N} r_d^j}{N} \tag{9}$$

$$c_d = \frac{\sum_{j=1}^{N} w^j r_d^j}{\sum_{j=1}^{N} w^j} \tag{10}$$

In the above formulas, "j" represents a sequential number of fingers, "N" represents the number of fingers to be connected ("j" is an integer of 1 to N"), "$r_d^j$" represents the tip position of a haptic device $16^j$ connected to the j-th finger and "$w^j$" represents weight of the j-th finger. Then, determination rules of the operation area offset amount by the above formulas (5) to (7) are extended as follows.

$$|c_{d_i}| < L \Rightarrow \Delta r_{v0i} = 0 \tag{11}$$

$$c_{d_i} > L \Rightarrow \Delta r_{v0i} = C(c_{d_i} - L) \tag{12}$$

$$c_{d_i} < -L \Rightarrow \Delta r_{v0i} = C(c_{d_i} + L) \tag{13}$$

Figure 8A:
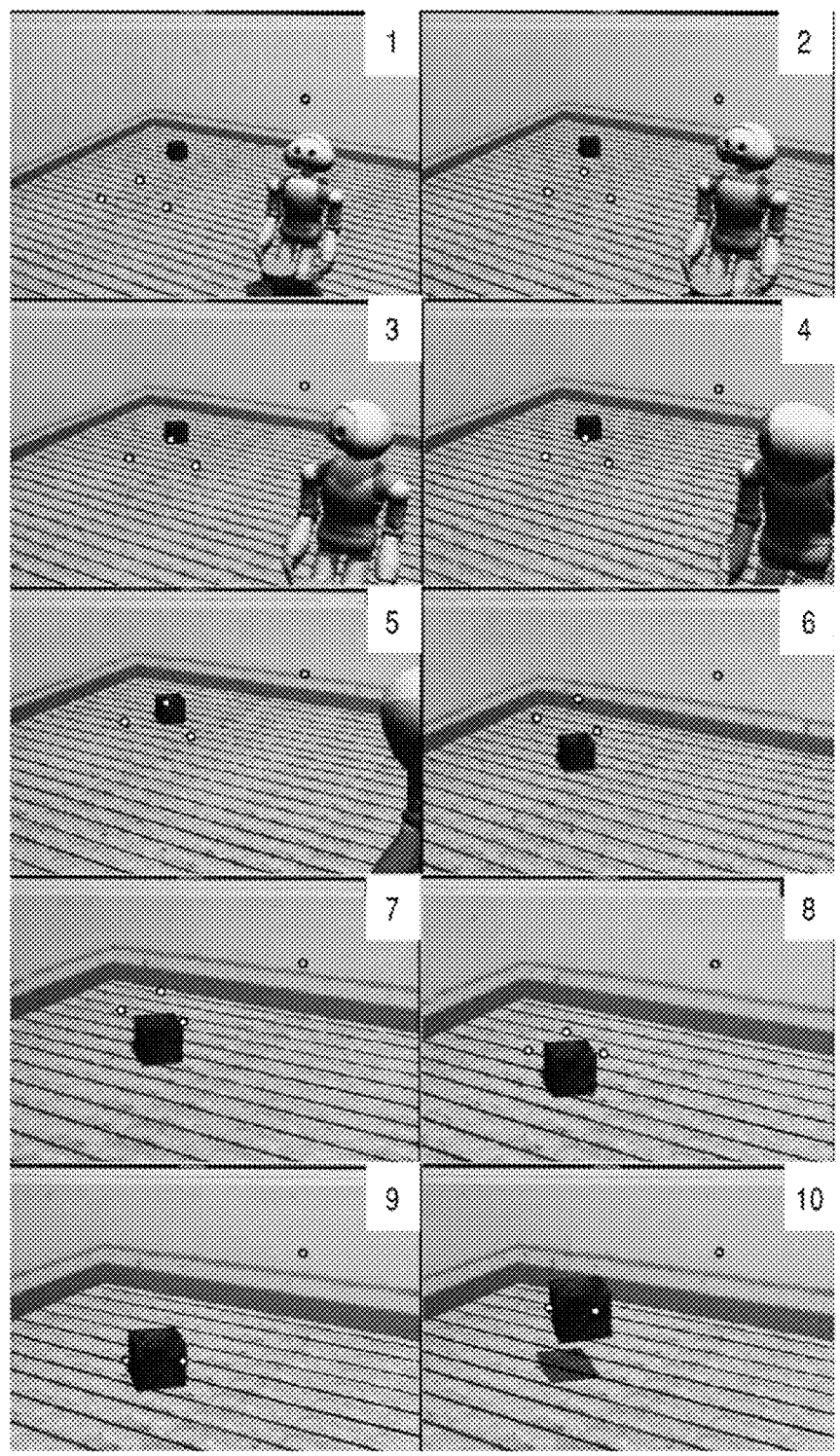
FIG. 8A is a view showing a display example of a CG screen drawn by a virtual environment drawing unit 115 when the invention is applied to the multi-finger system.
Figure 8B:
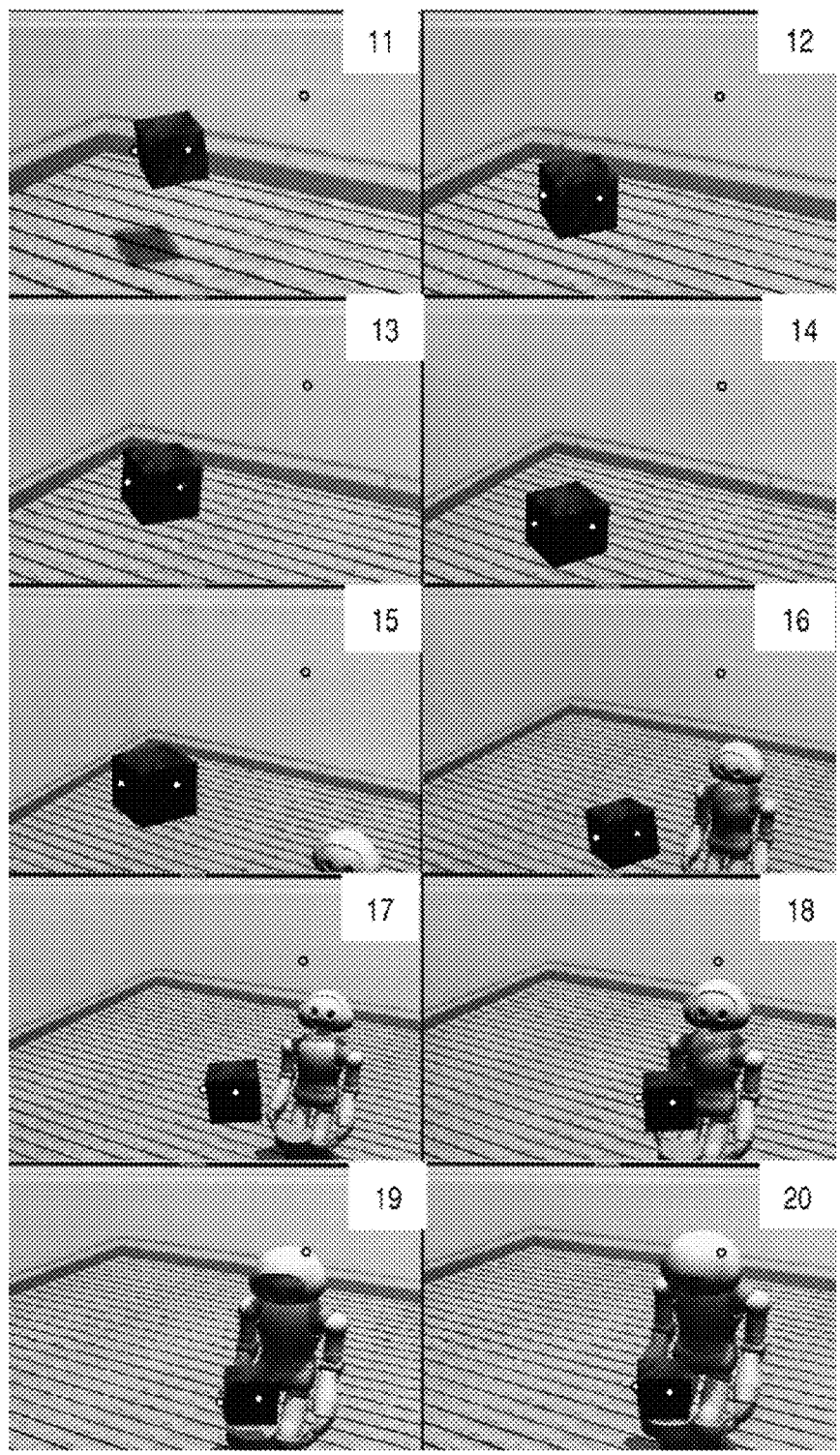
FIG. 8B is view showing a display example of a CG screen drawn by the virtual environment drawing unit 115 when the invention is applied to the multi-finger system.

FIG. 8A and FIG. 8B show a display example of a CG screen drawn in the virtual environment drawing unit 115 when the invention is applied to the multi-finger system. In the drawing, a situation in which interaction of a virtual object in virtual space and movement of the operation area are performed are shown in twenty frames. It should be sufficiently understood that it is possible to perform operation of stretching the hand to a distant cube which is unreachable in the physical operation area of the haptic device, gripping and handing the cube to the CG character in a natural manner. As shown in the drawing, the coordinate system of the camera model is moved together according to the offset amount "$\Delta r_{v0}$" of the origin position "$r_{v0}$" of the operation area $S_v$ in virtual space, thereby housing the designated position "$r_v$", namely, the finger pointer in the display screen of the display 15 at any time to maintain the state in which operation in the virtual environment is possible. On the other hand, when the movement of the origin position "$r_{v0}$" is not performed in virtual area, the user can touch only points near the head of the agent.

Figure 9:
FIG. 9 is a view showing an appearance of a multi-finger system for both arms.

Additionally, the multi-finger system is not limited to one arm but can be applied to both arms. Specifically, also in a system in which haptic devices shown in FIG. 7A and FIG. 7B are connected to respective right-and-left hands of the user as shown in FIG. 9, the operation area offset amount can be determined in accordance with the above formulas (11) to (13) based on the average position or the weighted average position of all fingers, thereby accessing an arbitrary position in virtual space in a natural manner as described above.

Figure 10:
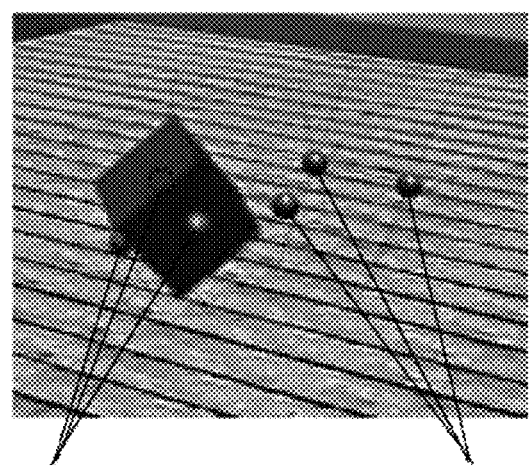
FIG. 10 is a view showing a display example of a CG screen in virtual environment in the multi-finger system for both arms.

FIG. 10 shows a display example of a CG screen of virtual environment in the multi-finger system for both arms. The pointer position determination unit 112 determines the position "$r_v^j$" of the finger pointer in virtual space by adding the origin position "$r_{v0}$" in virtual space by each finger "j" based on the above formula (1). Then, the virtual environment drawing unit 115 displays groups of finger pointers of left-and-right respective hands as shown in FIG. 9.

Figure 11:
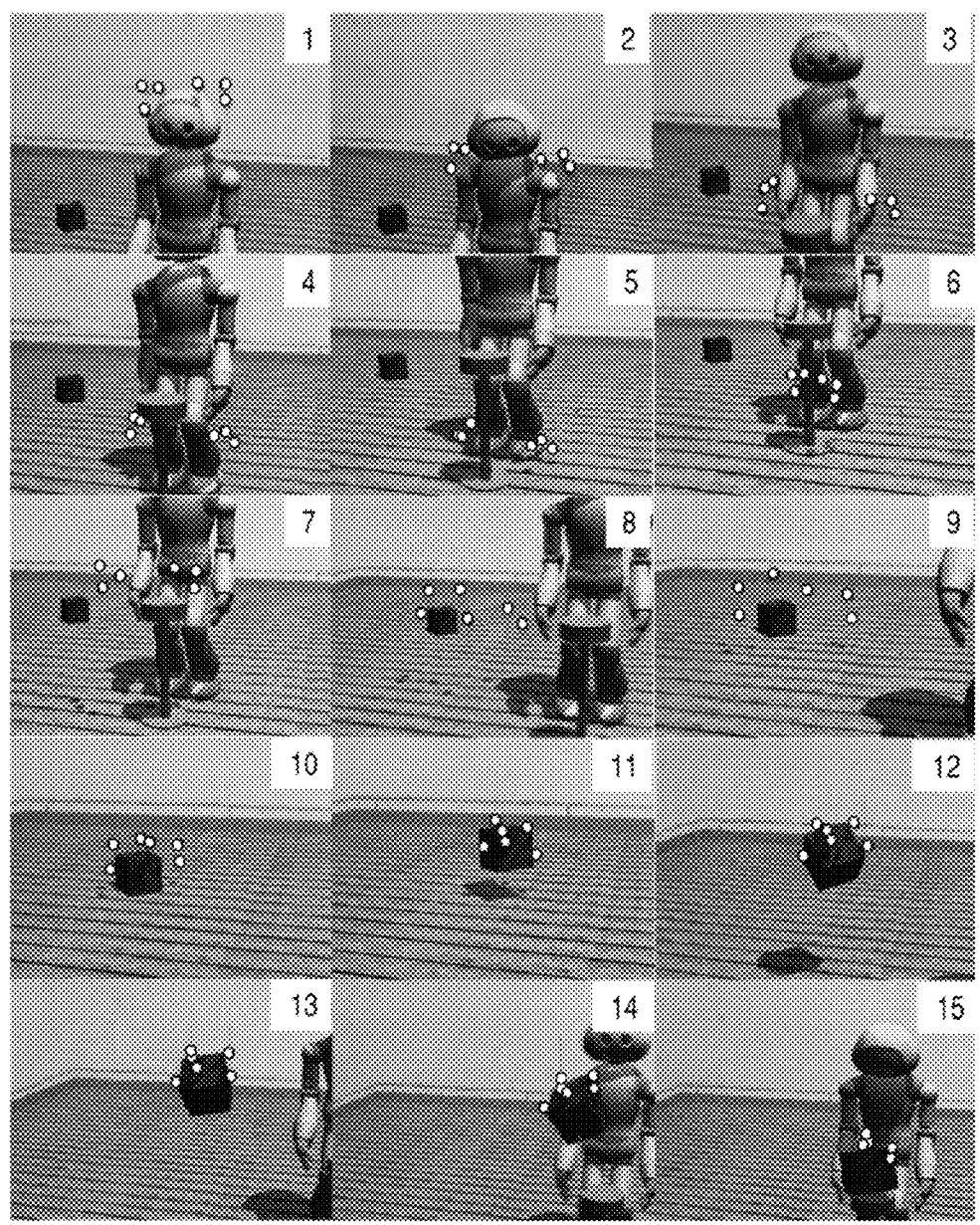
FIG. 11 is a view showing a state of touching respective portions of a body of the user and a state of gripping a distant cube by both hands and carrying the cube in front of a CG character (agent) in both arms system.

FIG. 11 shows a situation in which the user touches respective parts of the agent's body by both hands and the user grips a distant cube by both hands and carries the cube in front of the CG character (agent) in fifteen frames in both arms system. It is possible to perform the operation of stretching hands to the distant cube which is unreachable in the physical operation area of the haptic device, gripping and handing the cube to the CG character in a natural manner in the same manner as FIGS. 8A and 8B. In addition, the coordinate system of the camera model is moved together according to the offset amount "$\Delta r_{v0}$" of the origin position "$r_{v0}$" of the operation area $S_v$ in virtual space, therefore, it is possible to house finger pointers of respective fingers in the display screen of the display 15 at any time and to maintain the state in which operation in the virtual environment is possible.

Figure 12:
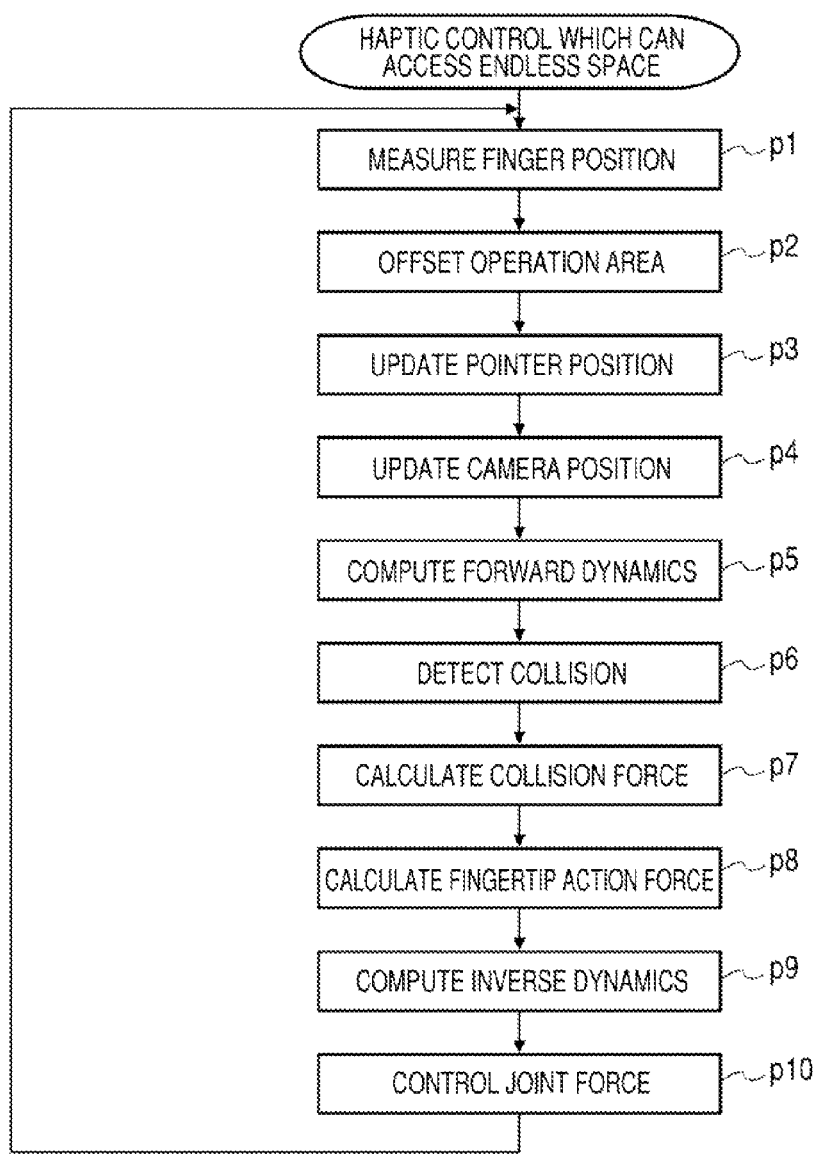
FIG. 12 is a flowchart showing a processing procedure for performing drawing output and force/tactile feedback in the virtual environment by performing a control program having the configuration shown in FIG. 3 in a computer 10 shown in FIG. 1.

FIG. 12 shows a processing procedure for performing drawing output of virtual environment and force/tactile feedback by executing a control program having the configuration shown in FIG. 3 in the computer 10 shown in FIG. 1 in a form of a flowchart.

First, in the haptic device position measurement unit 110, the tip position of the haptic device 16 ("$r_d$" in the formula (1)) is calculated by forward dynamics computation based on the output values of encoders attached to the haptic device 16 (Process p1).

Next, in the operation area offset amount determination unit 111, the position "$r_{v0}$" of the origin of the haptic device 16 in virtual space is offset in accordance with the above formulas (5) to (7) (Process p2).

The operation area Sd of the haptic device in real space is divided into two which are the interaction area at the center and the movement area at peripheral edges as shown in FIG. 5. When the position "$r_d$" designated by the haptic device 16 is within the interaction area, user operation is a particular user operation with respect to the operation area $S_v$ (the virtual object in the area) in virtual space, and offset is not given to the position "$r_{v0}$" in virtual space as represented by the above formula (5). On the other hand, the position "$r_d$" designated by the haptic device 16 enters the movement area, offset is given to the operation area $S_v$ according to the infiltration amount to the movement area in accordance with the following formula (6) or (7). As a result, though the range in which the haptic device itself can mechanically move is limited, it becomes possible to access an arbitrary position in virtual space extending endlessly.

Next, in the pointer position determination unit 112, the position "$r_v$" of the finger pointer in virtual space is determined according to the above formula (1) (Process p3).

Subsequently, in the camera position determination unit 113, the position of camera coordinate system is determined so that the origin position of the haptic device 16 is in a fixed position "$^e r_v$" seen from the coordinate system of the camera model as shown in FIG. 4 (Process p4).

The camera position determination unit 113 moves the coordinate system of the camera model together according to the offset amount "$\Delta r_{v0}$" of the origin position "$r_{v0}$" of the operation area $S_v$ in virtual space, thereby housing the designated position "$r_v$", namely, the finger pointer in the drawing area at any time to maintain the state in which operation in virtual environment is possible. On the other hand, if the camera coordinate system is not moved in conjunction of the movement of the origin position "$r_{v0}$", the finger pointer is left behind at the outside of the drawing area with the movement of the operation area $S_v$ in virtual space, which leads to the state in which operation is unavailable.

Next, in the forward dynamics computation unit 102, computation for dynamics simulation is executed for micro-time (for example, 1 millisecond), and the position and the posture of respective objects in the three-dimensional object data accumulation unit 101 are updated (Process p5).

Next, in the collision detection unit 104, a collision between objects in the three-dimensional object data accumulation unit 101 is detected and a set of collision points is created (Process p6). For detecting collision, for example, GJK algorithm (described above) can be used.

Next, in the collision force calculation unit 105, an external force generated at the collision point is calculated and allowing the external force to act on the three-dimensional object data (Process p7).

Next, in the fingertip action force calculation unit 106, a force acted on the finger model in external forces calculated in the collision force calculation unit 105 is calculated (Process p8). In the case of multi-finger system, a resultant force of forces acted on respective finger models is calculated.

Next, in the inverse dynamics computation unit 107, a joint force necessary for generating the force at the tip of the haptic device 16 is calculated in consideration of the dynamics compensation (Process p9).

Next, in the joint force control unit 108, all joints are current-controlled so that the joint force obtained in the inverse dynamics computation unit 107 is realized (Process p10).

To execute the above contents every sufficient short time (for example, every 1 millisecond) is the summary of drawing output of virtual environment as well as force/tactile feedback processing executed on the computer 10 shown in FIG. 1.

In the above explanation, only translational motion has been explained as the movement of the operation area Sv in virtual space as shown in FIG. 4 and FIG. 5, however, it is a matter of course that the invention can be applied to rotational motion in the same manner. A point will be explained in detail below.

The tip of the haptic device shown in FIG. 2 can be rotated freely due to a gimbal mechanism in principle, however, there exist a movable range concerning the posture. Also in the movable range of the posture, the interaction area of the inside and the movement area of the outside are provided. Then, the operation area offset amount determination unit 111 rotates the coordinate system provided at the operation origin "$r_d$" of the haptic device 16 according to the infiltration amount to the movement area, thereby accessing an arbitrary position with an arbitrary posture.

At that time, the haptic device position measurement unit 110 also calculates a posture (3×3 matrix) of the haptic device "$R_d$", and the pointer position determination unit 112 determines a posture of the pointer "$R_v$" by adding a posture "$R_{v0}$" of the coordinate system set at the origin position of the haptic device 16 to the posture $R_d$ as shown in the following formula (14).

$$R_v = R_d R_{v0} \quad (14)$$

Then, the camera position determination unit 113 changes not only the camera position but also the camera posture according to the operation area offset amount as the camera model 114. That is, the camera position determination unit 113 changes a posture "$R_e$" of the camera coordinate system by the same amount as the rotation amount of the coordinate system of the origin of the haptic device 16. The operation area offset amount determination unit 111 also operates the posture "$R_{v0}$" of the operation origin coordinate system of the haptic device 16.

Figure 13:
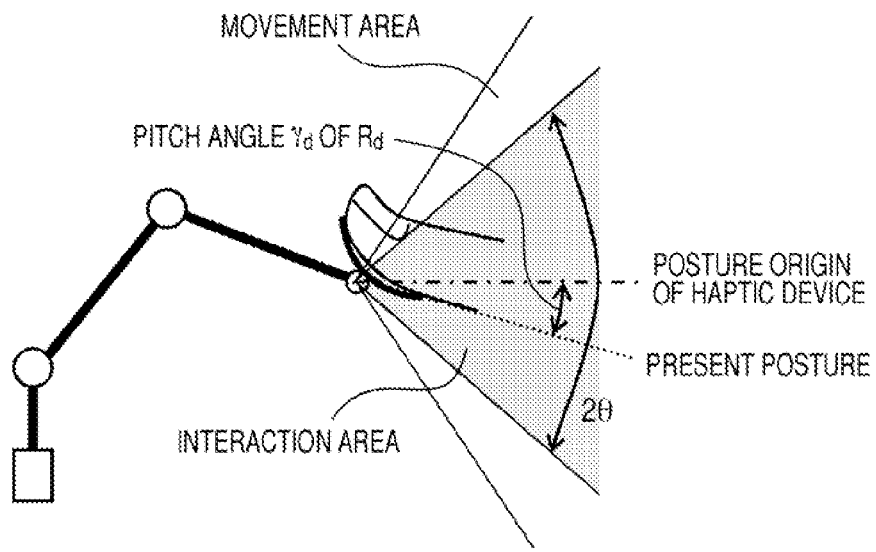
FIG. 13 is a view showing a state in which the operation area in real space possessed by the haptic device 16 is divided into two areas of a movement area at peripheral edges of the operation area and an interaction area which is inside the movement area (in the case of rotational motion)

As shown in FIG. 13, the area is divided into the interaction area of the inside (range of a posture angle $\Theta$) and the movement area of the outside thereof, taking a certain posture angle (front posture) as the center. The posture angle can be obtained by extracting a well-known Euler angle from the posture "$R_d$" of the haptic device 16 (in FIG. 13, only a pitch angle is shown).

When the posture angle reaches the movement area, the operation origin coordinate system of the haptic device 16 is rotated according to the infiltration amount to the movement area. When the pitch angle of the designated angle "$R_d$" in real space is "$\gamma_d$", determination rules of the operation area offset amount by the above formulas (5) to (7) are extended as the following formulas (15) to (17). In this case, "$\Delta\gamma_{v0}$" represents the increase of the pitch angle $\Theta$ of the posture "$R_{v0}$" of the operation origin coordinate system of the haptic device 16.

$$|\gamma_{d_i}| < \Theta \Rightarrow \Delta\gamma_{v0i} = 0 \quad (15)$$

$$\gamma_{d_i} > \Theta \Rightarrow \Delta\gamma_{v0i} = C(\gamma_{d_i} - \Theta) \quad (16)$$

$$\gamma_{d_i} < -\Theta \Rightarrow \Delta\gamma_{v0i} = C(\gamma_{d_i} + \Theta) \quad (17)$$

Figure 14:
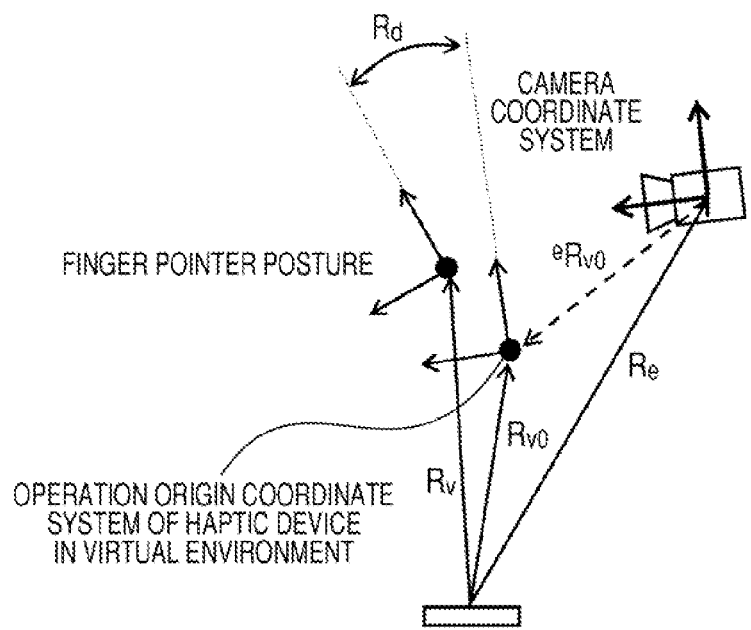
FIG. 14 is a view showing a state in which the position of the camera coordinate system is determined so that the origin position of the haptic device 16 seen from the camera coordinate system is at a fixed position "$^e R_v$" (in the case of rotational motion)

The posture "$R_e$" of the camera coordinate system is also moves in parallel according to posture change of the origin of the haptic device 16 in virtual space obtained from the above formulas (16), (17) as shown in FIG. 14. That is, the pitch angle of the camera coordinate system is represented as the following formula (18). In this case, "$\Delta\gamma_e$" represents the increase of the pitch angle of the camera posture "$R_e$".

$$\Delta\gamma_e = \Delta\gamma_{v0} \quad (18)$$

Figure 15:
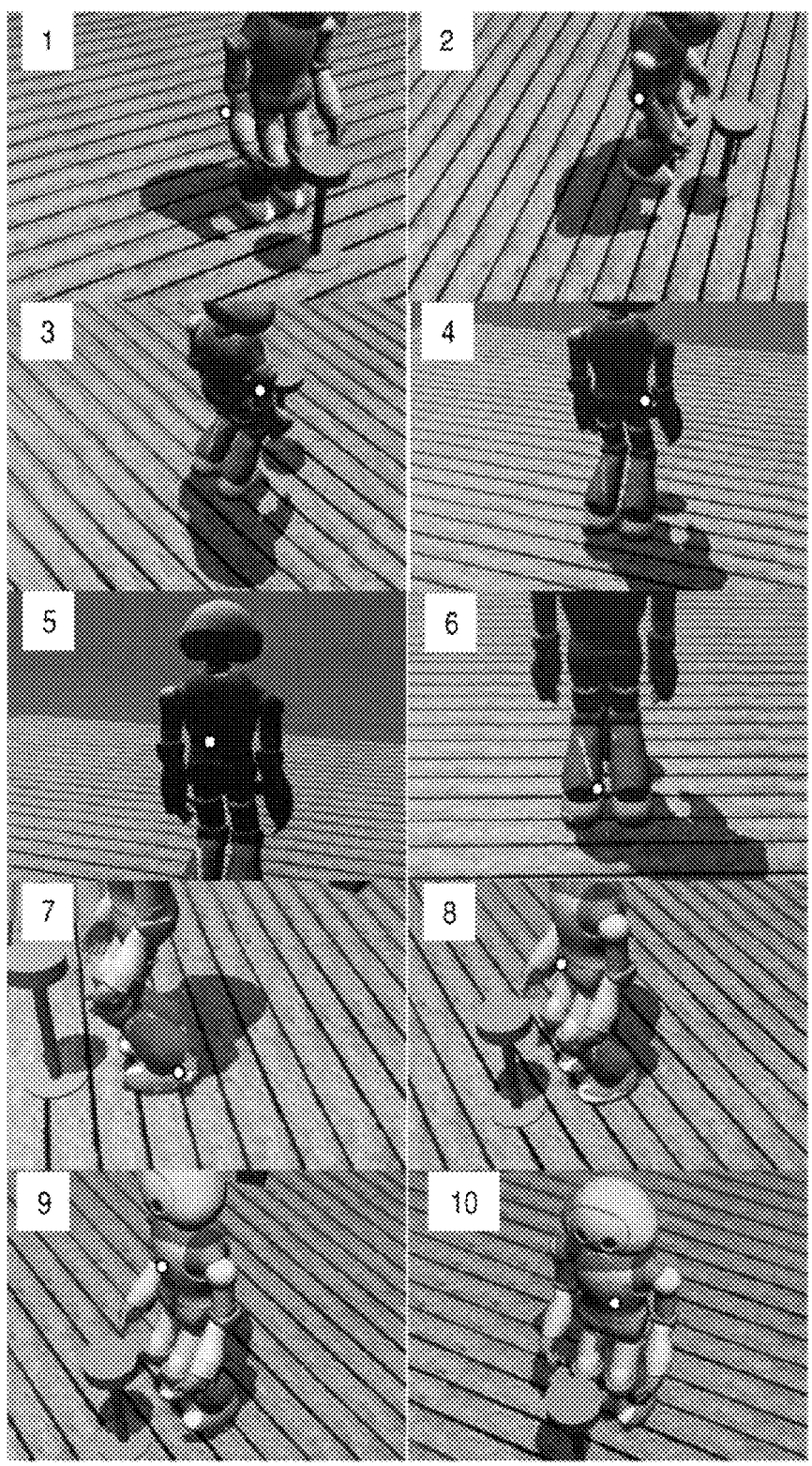
FIG. 15 is a view showing an example in which offset processing of the coordinate system of the operation origin of the haptic device 16 is added also to the posture and a CG character is accessed from various directions.
Figure 16:
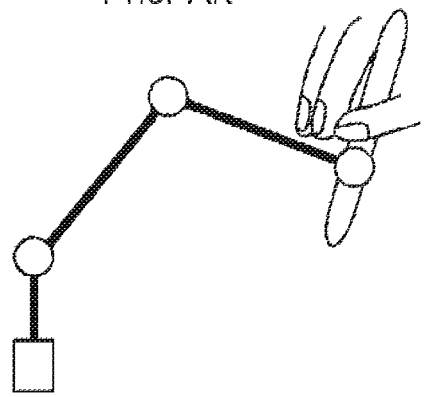
FIG. 16 is a view of a structure example of a pen-type haptic device using a serial link.
Figure 17:
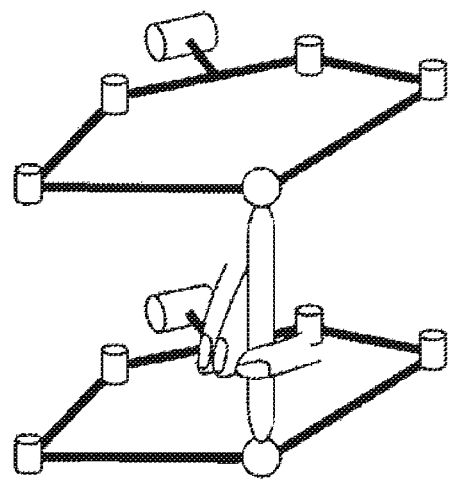
FIG. 17 is a view showing a structure example of a haptic device feeding back the 3-axis force to 6-axis force moment by using a parallel link structure.
Figure 18:
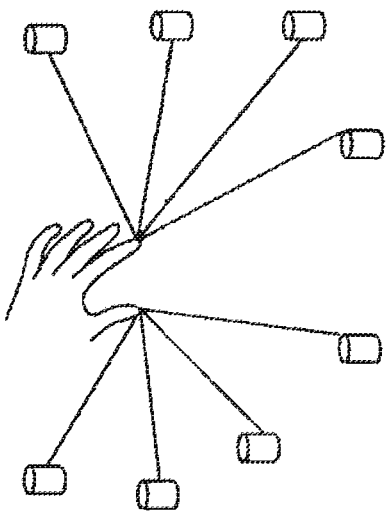
FIG. 18 is a view showing a structure example of a haptic device in which fingers and remote motors are connected by wires and force is applied to respective fingers through the wires.
Figure 19:
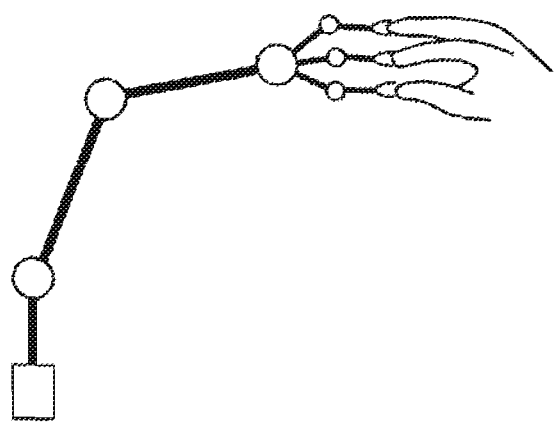
FIG. 19 is a view showing a structure example of a haptic device in which a hand-type force feedback mechanism is added to an opposed manipulator.
Figure 20:
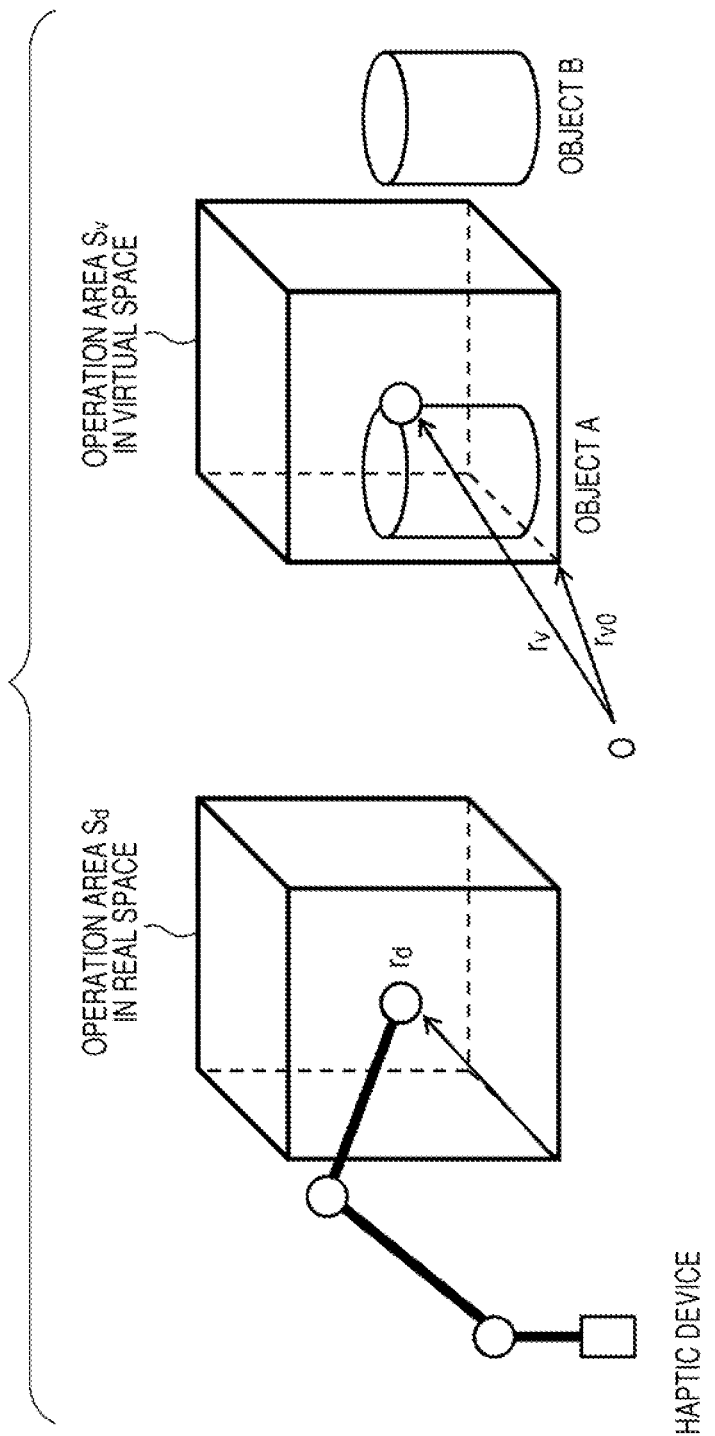
FIG. 20 is a view showing an operation area $S_d$ of the haptic device in real space and an operation area $S_v$ corresponding to the operation area $S_d$ in virtual space.
Figure 21:
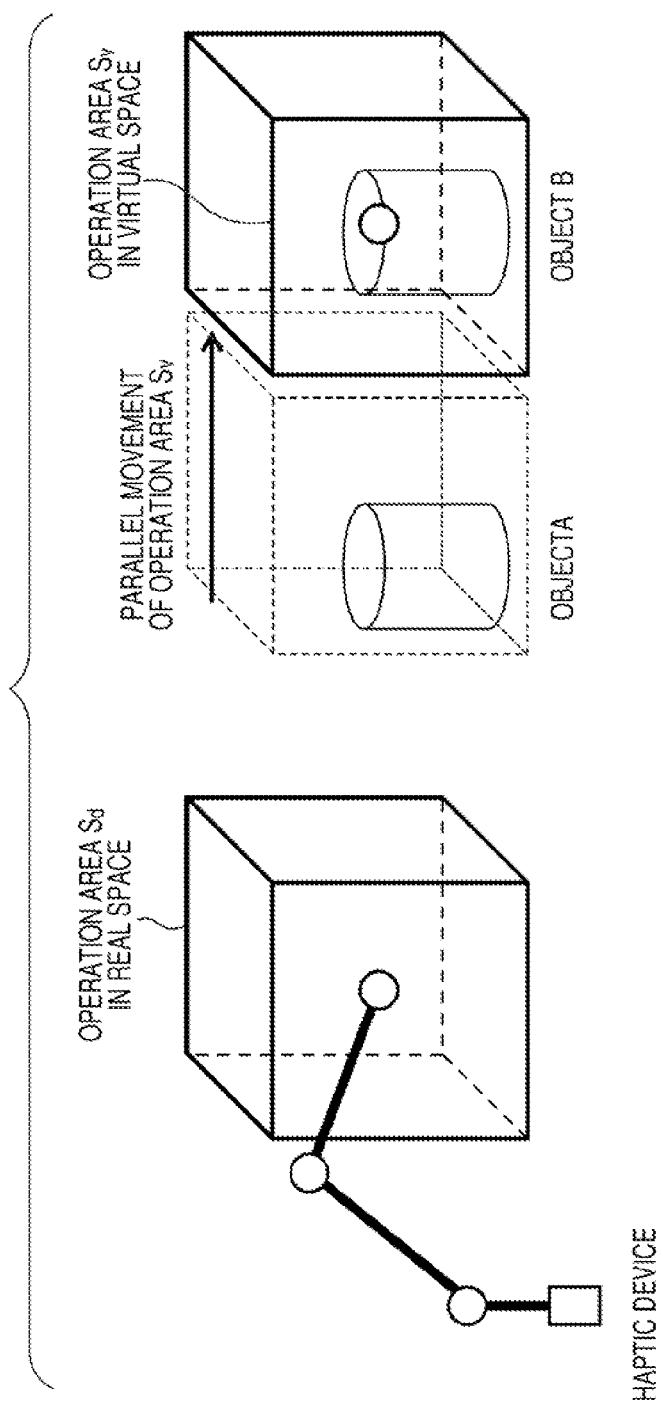
FIG. 21 is a view showing a state in which the operation area $S_v$ in virtual space corresponding to the operation area $S_d$ of the haptic device in the actual space is moved (parallel movement) to a position including a object B.

In FIG. 15, an example in which processing of the offset in the operation origin coordinate system of the haptic device 16 is added also to the posture to thereby access the CG character from various directions is shown. The movable ranges of the gimbals G1 to G3 are limited, however, it is easy to understand that the posture of the operation origin of the haptic device 16 and the camera posture are automatically changed, thereby accessing the CG character from all circumferential directions without exhausting the movable range. Also concerning the posture, it goes without saying that force/tactile interaction can be performed with performance possessed by the haptic device 16 originally because the offset of posture is not generated in the interaction area.

The invention has been described in detail with reference to the embodiments as the above. However, it should be understood by those skilled in the art that various modifications and alterations of the embodiment may occur insofar as they are within the scope of the gist of the invention.

The information input/output device according to the embodiment of the invention can be applied to various applications such as learning of special skills such as medical care or the like, remote operations in virtual environment such as microcosms or oceans and in special or dangerous environment such as a nuclear reactor for feeding back three-dimensional force/tactile senses with respect to objects in environments which are difficult to be actually touched.

Also, the information input/output device according to the embodiment of the invention enables access to an arbitrary position in virtual space extending endlessly by moving the operation area of virtual space by only the operation of stretching a hand in the direction of an object that the user desires to touch without using an additional input interface for moving the operation area of virtual space. This configuration can be applied not only the haptic device but also to various types of three-dimensional position input devices.

In short, the invention has been disclosed in a form of exemplification and the description contents of the present specification should not to be taken in a limited manner. In order to determine the gist of the invention, it is necessary to take claims into consideration.

The present application contains subject matter related to that disclosed in Japanese Patent Priority Application JP 2008-121996 filed in the Japan Patent Office on May 8, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information input/output device comprising:
   a position input unit, including a gimbaled finger holder portion holding a fingertip of a user by inserting the fingertip, configured to control a pointer in virtual space by designating a position by the user in a prescribed operation area $S_d$ in real space, and configured to feed back force in real space with respect to the fingertip through driven joints connected to the finger holder portion, the operation area $S_d$ being divided into:
      a movement area at the peripheral edges of the operation area $S_d$, and
      an interaction area inside the movement area;
   a designated position measurement unit configured to measure a designated position "$r_d$" in the operation area $S_d$, which is designated by the user in the position input unit;
   an operation area offset amount determination unit configured to determine whether the designated position "$r_d$" is in the movement area or the interaction area and to determine an offset amount "$\Delta r_{v0}$" of an origin position "$r_{v0}$" of a coordinate system of an operation area $S_v$ in virtual space corresponding to the operation area $S_d$ in real space based on the measured position "$r_d$" in the operation area $S_d$, wherein when the designated position "$r_d$" is in the movement area, the origin position "$r_{v0}$" is moved in the operation area $S_v$ in virtual space based on the offset amount "$\Delta r_{v0}$", and when the designated position "$r_d$" is in the interaction area, the origin position "$r_{v0}$" is not moved based on the offset amount "$\Delta r_{v0}$" and a feed back force is limited to interactions with virtual objects corresponding to the operation area $S_v$ in virtual space within the interaction area of the operation area $S_d$ in real space based on a location of the pointer;

a designated position determination unit configured to determine a designated position "$r_v$" in virtual space which corresponds to the position in real space designated by the user through the position input unit based on the measured position "$r_d$" in the operation area $S_d$, the origin position "$r_{v0}$" of the operation area $S_v$ in virtual space and the determined offset amount "$\Delta r_{v0}$"; and a camera position determination unit configured to move a coordinate system of a camera model for drawing a state in the virtual space according to the movement of the origin position "$r_{v0}$" based on the offset amount "$\Delta r_{v0}$".

2. The information input/output device according to claim 1, wherein the position input unit abuts on a fingertip or other parts of a body of the user, inputting "$r_d$" based on motion of the abutting portion as the designated position.

3. The information input/output device according to claim 2, further comprising:

a force/tactile feedback means for applying a force/tactile sense according to the position "$r_v$" in virtual space determined by the designated position determination unit to part of the body of the user abutting on the position input unit.

4. The information input/output device according to claim 3, wherein the force/tactile feedback means includes an object data accumulation unit configured to accumulate attribute information including geometric attribute and dynamic attribute possessed by respective objects existing in virtual space, a dynamics computation unit configured to perform dynamics computation with respect to respective objects accumulated in the object data accumulation unit as well as changing positions and postures of respective objects based on the computation results, a collision detection unit configured to detect a collision event between respective objects accumulated in the object data accumulation unit, a collision force calculation unit configured to calculate force acted at a collision point detected in the collision detection unit, an action force calculation means for calculating an action force to be applied to part of the body of the user which abuts on the position input unit based on the force calculated in the collision force calculation unit, and a force/tactile addition means for applying a force/tactile sense based on the action force calculated by the action force calculation means to part of the body of the user which abuts on the position input unit.

5. The information input/output device according to claim 1, further comprising:

a display; and a virtual environment drawing unit configured to render the state in virtual space from the viewpoint of the coordinate system defined as the camera model and displaying the state on the display.

6. The information input/output device according to claim 2, further comprising:

plural position input units respectively corresponding to plural fingers "j" of the user ("j" is a positive integer); and wherein the operation area offset amount determination unit determines the offset amount "$\Delta r_{v0}$" of the origin position "$r_{v0}$" of the operation area $S_v$ in virtual space based on an average position or a weighted average position of designated positions "$r_{jd}$" in the operation area $S_d$ designated by respective position input units.

7. An information input/output device comprising:

a position input unit including a gimbaled finger holder portion holding a fingertip of a user by inserting the fingertip, configured to control a pointer in virtual space by designating a position by the user in a prescribed operation area $S_d$ in real space, formed so as to perform rotational motion, taking a given front posture as the center, in which the user designates a posture angle as a position in a given operation area $S_d$ in real space, and configured to feed back force in real space with respect to the fingertip through driven joints connected to the finger holder portion, the operation area $S_d$ being divided into:

an interaction area in a range of a posture angle $\pm\Theta$ with respect to the front posture, and a movement area which is outside the interaction area;

a designated position measurement unit configured to measure a posture angle $R_d$ designated in the position input unit;

an operation area offset amount determination unit configured to determine whether the measured designated posture angle $R_d$ is in the interaction area or the movement area, and to determine an offset amount "$\Delta\gamma_{v0}$" of a front posture angle "$R_{v0}$" of a coordinate system of an operation area $S_v$ in virtual space corresponding to the operation area $S_d$ in real space based on the measured posture angle $R_d$, wherein when the designated posture angle "$R_d$" is in the movement area, the posture angle "$R_{v0}$" is moved in the operation area $S_v$ in virtual space based on the offset amount "$\Delta\gamma_{v0}$", and when the designated posture angle $R_d$ is in the interaction area, the posture angle "$R_{v0}$" is not moved based on the offset amount "$\Delta\gamma_{v0}$" and a feed back force is limited to interactions with virtual objects corresponding to the operation area $S_v$ in virtual space within the interaction area of the operation area $S_d$ in real space based on a location of the pointer;

a designated position determination unit configured to determine a designated posture $R_v$ in virtual space corresponding to the position in real space designated by the user through the position input unit based on the measured designated posture angle $R_d$ in the operation area $S_d$, the front posture angle "$R_{v0}$" of the operation area $S_v$ in virtual space and the determined offset amount "$\Delta\gamma_{v0}$"; and a camera position determination unit configured to move a coordinate system of a camera model for drawing a state in the virtual space according to the movement of the front posture angle "$R_{v0}$" based on the offset amount "$\Delta\gamma_{v0}$".

8. The information input/output device according to claim 7, further comprising:

a display; and a virtual environment drawing unit configured to render the state in virtual space from the viewpoint of the coordinate system defined as the camera model and displaying the state on the display.

9. An information input/output method comprising the steps of:

acquiring a designated position "$r_d$" in a prescribed operation area $S_d$ designated by a user through a position input unit which controls a pointer in virtual space by designating a position by the user in the operation area $S_d$ in real space, the position input unit including a gimbaled finger holder portion holding a fingertip of a user by inserting the fingertip, and the position input unit configured to feed back force in real space with respect to the fingertip through driven joints connected to the finger holder portion, the operation area $S_d$ being divided into:

a movement area at the peripheral edges of the operation area $S_d$, and an interaction area inside the movement area;

determining whether the designated position "$r_d$" is in the movement area or the interaction area;

determining an offset amount "$\Delta r_{v0}$" of an origin position "$r_{v0}$" of a coordinate system of an operation area $S_v$ in virtual space corresponding to the operation area $S_d$ in real space based on the acquired position "$r_d$" in the operation area $S_d$, wherein when the designated position "$r_d$" is in the movement area, the origin position "$r_{v0}$" is moved based on the offset amount "$\Delta r_{v0}$" and when the designated position "$r_d$" is in the interaction area, the origin position "$r_{v0}$" is not moved based on the offset amount "$\Delta r_{v0}$" and a feed back force is limited to interactions with virtual objects corresponding to the operation area $S_v$ in virtual space within the interaction area of the operation area $S_d$ in real space based on a location of the pointer;

determining a designated position "$r_v$" in virtual space which corresponds to the position in real space designated by the user through the position input unit based on the acquired position "$r_d$" in the operation area $S_d$, the origin position "$r_{v0}$" of the operation area $S_v$ in virtual space and the determined offset amount "$\Delta r_{v0}$"; and moving a coordinate system of a camera model for drawing a state in the virtual space according to the movement of the origin position "$r_{v0}$" based on the offset amount "$\Delta r_{v0}$".

10. A non-transitory computer-readable medium storing a computer program that, when executed by a computer, causes the computer to execute:

a designated position acquiring process acquiring a designated position "$r_d$" in a prescribed operation area $S_d$ designated by the user through a position input unit configured to control a pointer in virtual space by designating a position by the user in the operation area $S_d$ in real space, the position input unit including a gimbaled finger holder portion holding a fingertip of a user by inserting the fingertip, and the position input unit configured to feed back force in real space with respect to the fingertip through driven joints connected to the finger holder portion, the operation area $S_d$ being divided into:

a movement area at the peripheral edges of the operation area $S_d$, and an interaction area inside the movement area;

an operation area offset amount determination process determining whether the designated position "$r_d$" is in the movement area or the interaction area, and determining an offset amount "$\Delta r_{v0}$" of an origin position "$r_{v0}$" of a coordinate system of an operation area $S_v$ in virtual space corresponding to the operation area $S_d$ in real space based on the acquired position "$r_d$" in the operation area $S_d$, wherein when the designated position "$r_d$" is in the movement area, the origin position "$r_{v0}$" is moved in the operation area $S_v$ in virtual space based on the offset amount "$\Delta r_{v0}$", and when the designated position "$r_d$" is in the interaction area, the origin position "$r_{v0}$" is not moved based on the offset amount "$\Delta r_{v0}$" and a feed back force is limited to interactions with virtual objects corresponding to the operation area $S_v$ in virtual space within the interaction area of the operation area $S_d$ in real space based on a location of the pointer;

a designated position determination process determining a designated position "$r_v$" in virtual space which corresponds to the position in real space designated by the user through the position input unit based on the acquired position "$r_d$" in the operation area $S_d$, the origin position "$r_{v0}$" of the operation area $S_v$ in virtual space and the determined offset amount "$\Delta r_{v0}$"; and a camera position determination process moving a coordinate system of a camera model for drawing a state in the virtual space according to the movement of the origin position "$r_{v0}$" based on the offset amount "$\Delta r_{v0}$".

* * * * *